US011102643B2

(12) United States Patent
Lin

(10) Patent No.: US 11,102,643 B2
(45) Date of Patent: Aug. 24, 2021

(54) METHOD AND APPARATUS FOR DETERMINING SIZE OF PREEMPTION INDICATION IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/367,995

(22) Filed: Mar. 28, 2019

(65) Prior Publication Data
US 2019/0306700 A1   Oct. 3, 2019

Related U.S. Application Data

(60) Provisional application No. 62/650,660, filed on Mar. 30, 2018, provisional application No. 62/651,493, filed on Apr. 2, 2018.

(51) Int. Cl.
| | |
|---|---|
| *H04W 8/24* | (2009.01) |
| *H04W 72/04* | (2009.01) |
| *H04W 72/12* | (2009.01) |
| *H04W 76/11* | (2018.01) |
| *H04W 24/08* | (2009.01) |
| *H04W 74/08* | (2009.01) |
| *H04L 5/00* | (2006.01) |

(52) U.S. Cl.
CPC ............ *H04W 8/24* (2013.01); *H04L 5/0053* (2013.01); *H04L 5/0094* (2013.01); *H04W 24/08* (2013.01); *H04W 72/042* (2013.01); *H04W 72/0446* (2013.01); *H04W 72/1289* (2013.01); *H04W 74/0833* (2013.01); *H04W 76/11* (2018.02); *H04L 5/0007* (2013.01)

(58) Field of Classification Search
None
See application file for complete search history.

(56) References Cited

U.S. PATENT DOCUMENTS

| | | | |
|---|---|---|---|
| 2018/0070341 A1* | 3/2018 | Islam | H04L 1/1812 |
| 2018/0367263 A1 | 12/2018 | Ying et al. | |
| 2020/0351887 A1* | 11/2020 | Miao | H04W 76/27 |

FOREIGN PATENT DOCUMENTS

WO   2018064128 A1   4/2018

OTHER PUBLICATIONS

Ericsson, 3GPP TSG RAN Meeting #79 RP-180479, Mar. 21, 2018 Corrections for EN-DC, pp. 97-98 (Year: 2018).*

(Continued)

*Primary Examiner* — Lonnie V Sweet
(74) *Attorney, Agent, or Firm* — Cooper Legal Group, LLC

(57) ABSTRACT

A method and apparatus are disclosed. In an example, a User Equipment (UE) is configured with a size associated with downlink control information (DCI) corresponding to one or more preemption indications. In some examples, the size is equal to a first value that is not a multiple of a defined value. Alternatively and/or additionally, the UE is configured with a starting position of a field associated with the DCI. The starting position is equal to a second value that is a multiple of the defined value. Alternatively and/or additionally, a first DCI comprising a first preemption indication is transmitted to the UE based upon the size and/or the starting position.

20 Claims, 17 Drawing Sheets

(56) References Cited

OTHER PUBLICATIONS

"Corrections on Multiplexing Data with Different Transmission Durations", Samsung; Feb. 26-Mar. 2, 2018; 3GPP TSG RAN WG1 Meeting #92, R1-1801986; Athens, Greece; 2 pgs.
"Remaining Issues for Preemption Indication", Asustek; Apr. 2018; 3GPP TSG RAN WG1 Meeting #92bis, R1-1804086; Sanya, China, 2 pgs.
"Correctons for EN-DC"; Ericsson; Mar. 2018; 3GPP TSG RAN WG1 Meeting #79, RP-180479 Chennai, India, 266 pgs.
European search report from corresponding EP Application No. 19165712.1 dated Jun. 27, 2019, 9 pgs.
Taiwan Office Action from corresponding TW Application No. 108111067 dated Mar. 5, 2020, 12 pgs.
ASUSTek, "Discussion on preemption indication", 3GPP TSG RAN WG1 Metting #92, R1-1802248, Feb. 26-Mar. 2, 2018.
NEC, "Discussion on DL preemption indication", 3GPP TSG RAN WG1 Meeting 90bis, R1-1718013, Prague, CZ, Oct. 9-13, 2017.
European Office Action from corresponding EP Application No. 19165712.1 dated Mar. 3, 2020, 7 pgs.
Intel Corporation, Multiplexing of Different Data Channel Durations, 3GPP TSG RAN WG1 #90b R1-1717398, 3GPP, Oct. 3, 2017.
Sony, Remaining issues on pre-emption indicator, 3GPP TSG RAN WG1 adhoc_NR_AH_1709 R1-1716251, 3GPP, Sep. 11, 2017.
Huawei, HiSilicon, On-preemption indication for DL multiplexing of URLLC and eMBB, 3GPP TSG RAN WG1 adhoc_NR_AH_1709 R1-1715409, 3GPP, Sep. 9, 2017.
Huawei, Outcome of email discussion [NR-AH1801#21][NR] 38.331 ASN.1 review part 3—L2 params (Huawei), 3GPP TSG RAN WG2 #101 R2-1803955, 3GPP, Mar. 2, 2018.
Japanese Office Action from corresponding JP Application No. 2019-063364 dated Mar. 10, 2020, 6 pgs.
Indian Office Action from corresponding Indian Application No. 201914012135 dated Mar. 27, 2020. English Translation.
Korean Office Action from corresponding KR Application No. 10-2019-0035823 dated Nov. 175, 2020. English Translation.

* cited by examiner

500 →

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

600 →

700

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | U | U |
| 47 | D | D | X | U | U | U | D | D | X | U | U | U | U | U |
| 48 | D | X | U | U | U | U | D | X | U | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 – 255 | Reserved | | | | | | | | | | | | | |

| $\Delta f_{RA}$ | Number of PRACH slots within a subframe | PRACH slot number | $t_{start}^{RA}$ |
|---|---|---|---|
| 1.25 | 1 | 1 | $t_{start,l}^{u}$ with $\mu = 0$ |
| 5 | 1 | 1 | $t_{start,l}^{u}$ with $\mu = 0$ |
| 15 | 1 | 1 | $t_{start,l}^{u}$ with $\mu = 0$ |
| 30 | 1 | 2 | $t_{start,l+14}^{u}$ with $\mu = 1$ |
| 30 | 2 | 1 | $t_{start,l}^{u}$ with $\mu = 1$ |
| 30 | 2 | 2 | $t_{start,l+14}^{u}$ with $\mu = 1$ |

| $\Delta f_{RA}$ | Number of PRACH slots within a 60 kHz slot | PRACH slot number | $t_{start}^{RA}$ |
|---|---|---|---|
| 60 | 1 | 1 | $t_{start,l}^{u}$ with $\mu = 2$ |
| 120 | 1 | 1 | $t_{start,l+14}^{u}$ with $\mu = 2$ |
| 120 | 2 | 1 | $t_{start,l}^{u}$ with $\mu = 2$ |
| 120 | 2 | 2 | $t_{start,l+14}^{u}$ with $\mu = 2$ |

| CCE Aggregation Level | Number of Candidates |
|---|---|
| 4 | 4 |
| 8 | 2 |
| 16 | 1 |

| $\mu$ | Maximum number of PDCCH candidates per slot and per serving cell $M_{PDCCH}^{max,slot}$ |
|---|---|
| 0 | 44 |
| 1 | 36 |
| 2 | 22 |
| 3 | 20 |

| • | $\mu$ | • | Maximum number of non-overlapped CCEs per slot and per serving cell $C_{PDCCH}^{max,slot}$ |
|---|---|---|---|
| ★ | 0 | ★ | 56 |
| ★ | 1 | ★ | 56 |
| ★ | 2 | ★ | 48 |
| ★ | 3 | ★ | 32 |

```
-- ASN1START
-- TAG-DOWNLINKPREEMPTION-START

-- Configuration of downlink preemption indication on PDCCH.
DownlinkPreemption ::=                    SEQUENCE {
    -- RNTI used for indication pre-emption in DL.
    -- Corresponds to L1 parameter 'INT-RNTI', where "INT" stands for "interruption" (see
38.213, section 10)
    int-RNTI                              RNTI-Value, -- Set selection for DL-preemption indication. Corresponds to L1 parameter 'int-TF-unit'
(see 38.213, section 10.1)
    -- The set determines how the UE interprets the DL preemption DCI payload.
    timeFrequencySet                      ENUMERATED {set0, set1}, -- Total length of the DCI payload scrambled with INT-RNTI. The value must be an integer
multiple of 14 bit.
    -- Corresponds to L1 parameter 'INT-DCI-payload-length' (see 38.213, section 11.2)
    dci-PayloadSize                       INTEGER (0..maxINT-DCI-PayloadSize), -- Indicates (per serving cell) the position of the 14 bit INT values inside the DCI
payload.
    -- Corresponds to L1 parameter 'INT-cell-to-INT' and 'cell-to-INT' (see 38.213, section
11.2)
    int-ConfigurationPerServingCell       SEQUENCE (SIZE (1..maxNrofServingCells)) OF INT-
ConfigurationPerServingCell,
    ...
}

INT-ConfigurationPerServingCell ::=       SEQUENCE {
    servingCellId                         ServCellIndex,
    -- Starting position (in number of bit) of the 14 bit INT value applicable for this serving
cell (servingCellId) within the DCI
    -- payload. Must be multiples of 14 (bit). Corresponds to L1 parameter 'INT-values' (see
38.213, section 11.2)
    positionInDCI                         INTEGER (0..maxINT-DCI-PayloadSize-1)
}

-- TAG-DOWNLINKPREEMPTION-STOP
-- ASN1STOP
```

FIG. 14

METHOD AND APPARATUS FOR DETERMINING SIZE OF PREEMPTION INDICATION IN A WIRELESS COMMUNICATION SYSTEM

CROSS-REFERENCE TO RELATED APPLICATIONS

The present application claims the benefit of U.S. Provisional Patent Application Ser. No. 62/650,660 filed on Mar. 30, 2018, the entire disclosure of which is incorporated herein in its entirety by reference. The present application also claims the benefit of U.S. Provisional Patent Application Ser. No. 62/651,493 filed on Apr. 2, 2018, the entire disclosure of which is incorporated herein in its entirety by reference.

FIELD

This disclosure generally relates to wireless communication networks, and more particularly, to a method and apparatus for determining a size of a preemption indication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example, a User Equipment (UE) is configured with a size associated with downlink control information (DCI) corresponding to one or more preemption indications. In some examples, the size is equal to a first value that is not a multiple of a defined value. Alternatively and/or additionally, the UE is configured with a starting position of a field associated with the DCI. The starting position is equal to a second value that is a multiple of the defined value. Alternatively and/or additionally, a first DCI comprising a first preemption indication is transmitted to the UE based upon the size and/or the starting position.

BRIEF DESCRIPTION OF THE DRAWINGS

FIG. 7A illustrates a table associated with a number of OFDM symbols per slot, a number of slots per frame and/or a number of slots per subframe for a normal cyclic prefix (CP).

FIG. 7B illustrates a table associated with a number of OFDM symbols per slot, a number of slots per frame and/or a number of slots per subframe for an extended CP FIG. 8 illustrates a table associated with slot formats in a normal CP.

FIG. 9 illustrates a table associated with a starting position for an exemplary Physical Random Access Channel (PRACH) preamble.

FIG. 10 illustrates a table associated with a starting position for an exemplary PRACH preamble.

FIG. 11 illustrates a table associated with Control Channel Element (CCE) aggregation levels and/or a number of Physical Downlink Control Channel (PDCCH) candidates per CCE aggregation level.

FIG. 12 illustrates a table associated with a maximum number of PDCCH candidates per slot and/or per serving cell.

FIG. 13 illustrates a table associated with a maximum number of non-overlapped CCEs per slot and/or per serving cell.

FIG. 14 illustrates an exemplary DownlinkPreemption information element.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R1-1803554, 3GPP TS 38.213 V15.0.1, "NR Physical layer procedures for control", Samsung; R1-1803553, "CR to 38.212 capturing the Jan18 ad-hoc and RAN1 #92 meeting agreements", Huawei; RP-180479, "Corrections for EN-DC", Ericsson. The standards and documents listed above are hereby expressly incorporated by reference in their entirety.

Figure 1:
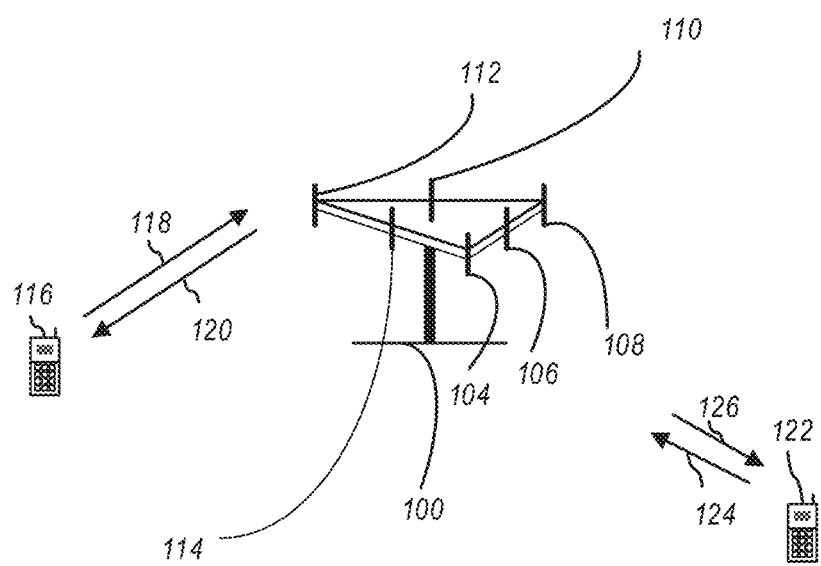
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
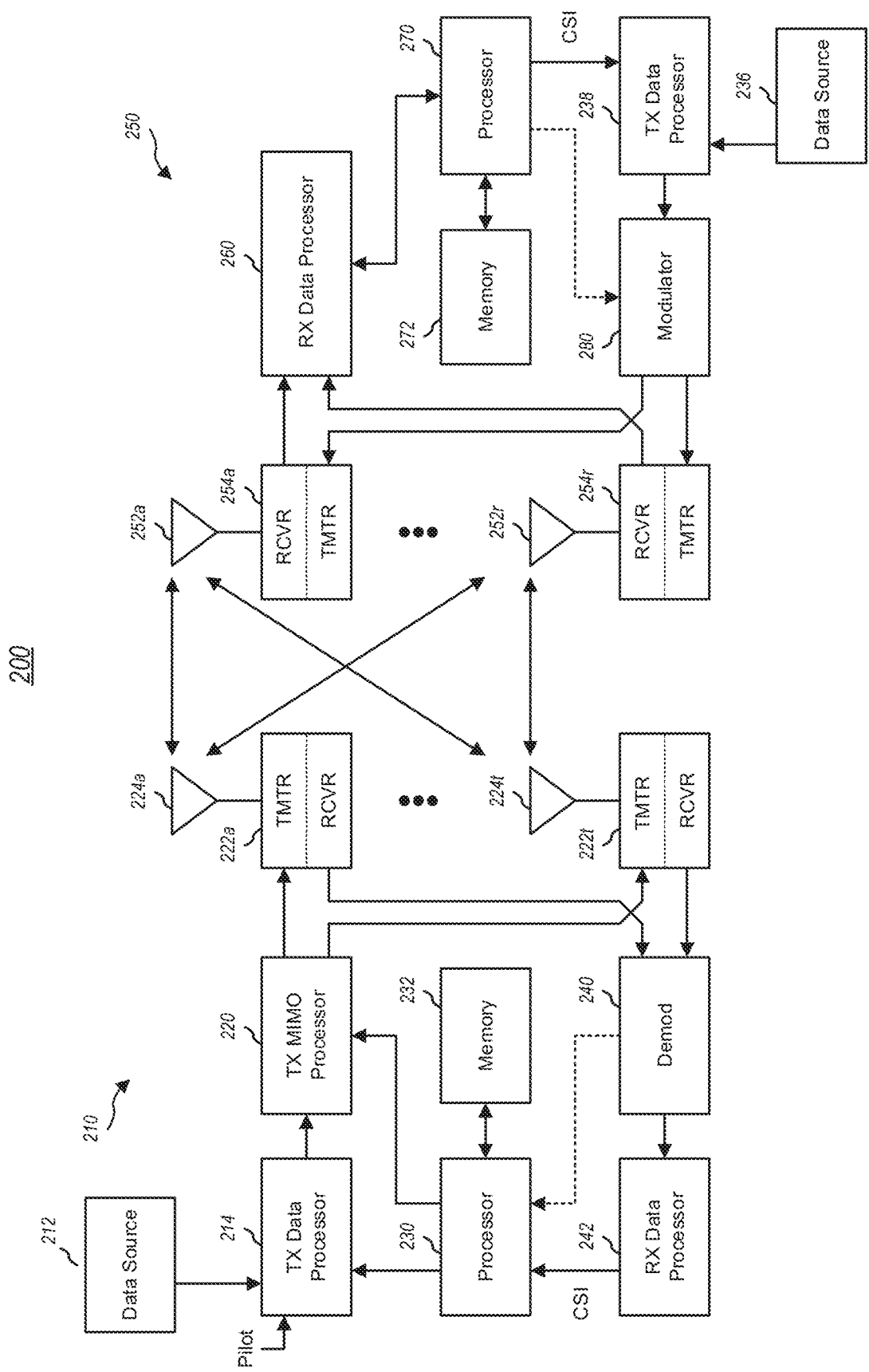
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further processe the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
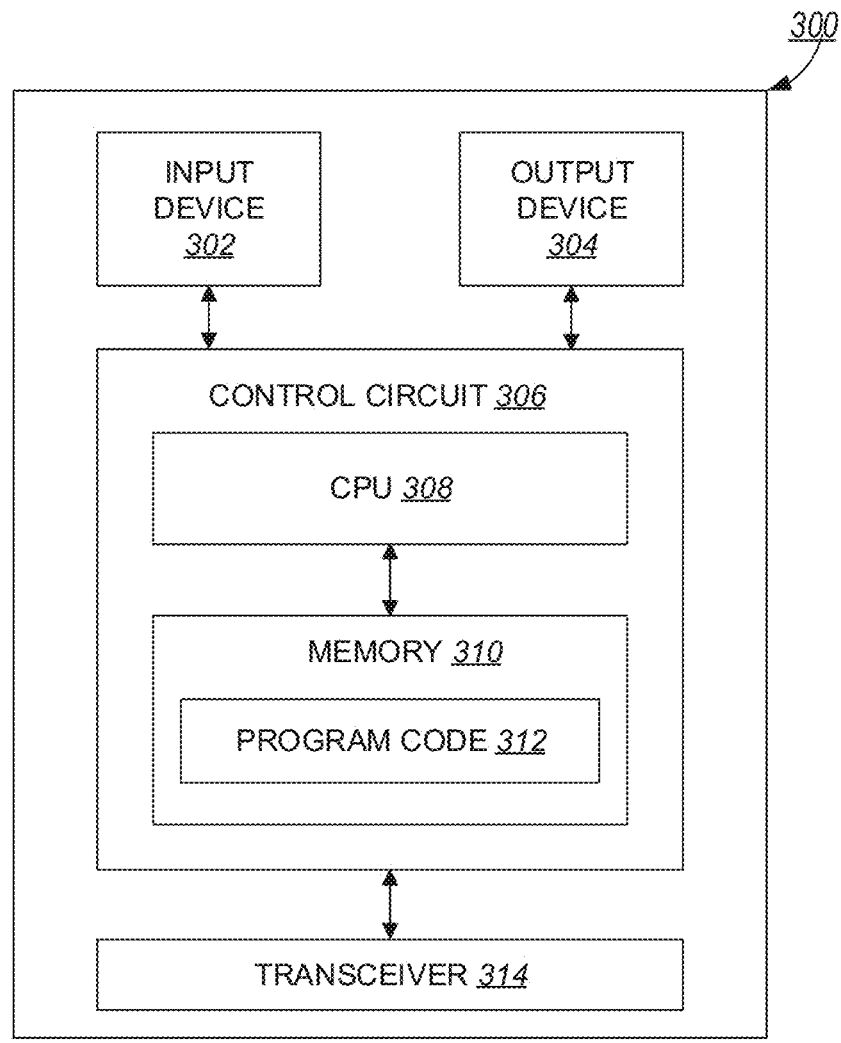
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
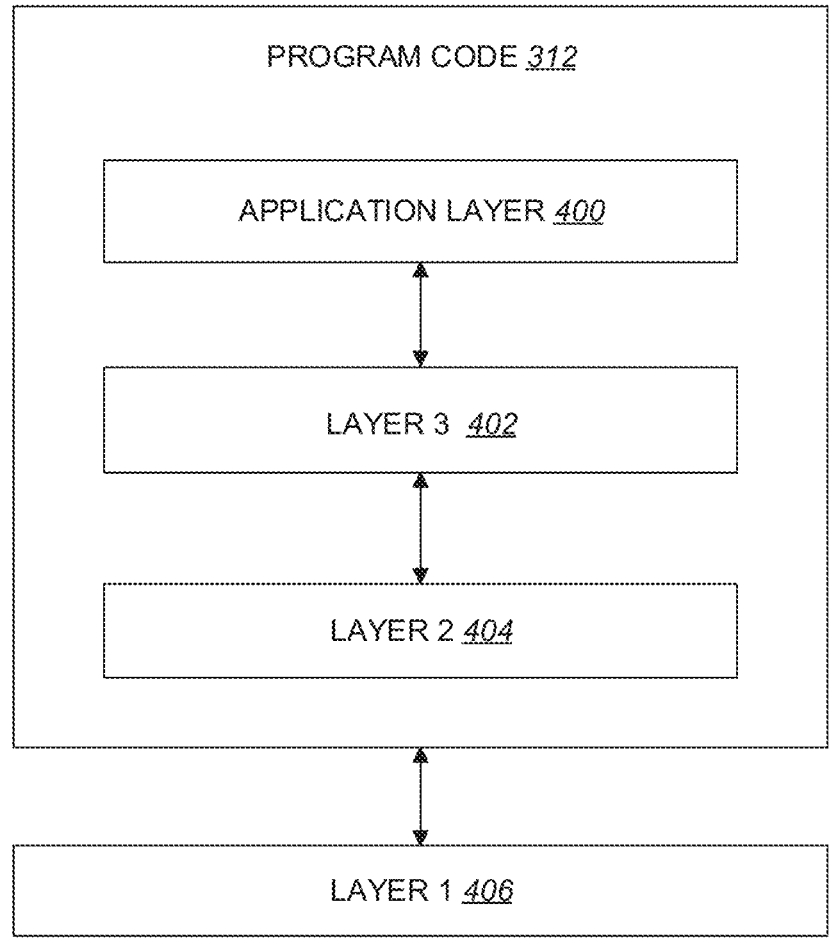
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more frame structures associated with Radio Access Technology (RAT) and/or New RAT (NR) (associated with 5G) may accommodate various requirements associated with time resources and/or frequency resources (e.g., ultra-low latency (e.g., ~0.5 ms)) to delay-tolerant traffic for Machine Type Communication (MTC), from a high peak rate for enhanced Mobile Broadband (eMBB) to a very low data rate for MTC. Low latency (e.g., short Transmission Time Interval (TTI)) and/or mixing/adapting different TTIs may be important for various applications. In addition to diverse services and requirements, forward compatibility is an important consideration in an initial NR frame structure design as not all features of NR would be included in the beginning phase/release of NR.

Reducing protocol latency may be an important improvement between different generations/releases, which can improve efficiency as well as meeting new application requirements (e.g., real-time service). An effective method adopted to reduce latency is to reduce a length of TTIs from 10 milliseconds (ms) in 3G to 1 ms in LTE.

Backward compatibility may not be required in an NR system. Numerology may be adjusted such that reducing a symbol number of a TTI is not the only way to change TTI length. In an example associated with LTE numerology, 14 Orthogonal Frequency Division Multiplexing (OFDM) symbols may be associated with 1 ms and/or a subcarrier spacing of 15 KHz. When the subcarrier spacing increases to 30 KHz, where a Fast Fourier Transform (FFT) size and/or a cyclic prefix (CP) structure may not change, there may be 28 OFDM symbols in 1 ms and/or the TTI may become 0.5 ms if the number of OFDM symbol in a TTI is kept the same. Accordingly, a design between different TTI lengths may be kept common, with scalability performed on the subcarrier spacing. One or more of FFT size, Physical Resource Block (PRB) definition/number, CP design, supportable system bandwidth, subcarrier spacing selection, etc. may be configured in association with subcarrier spacing selection. As NR is associated with a larger system bandwidth and/or a larger coherence bandwidth, inclusion of a larger subcarrier spacing may be beneficial.

Because it may be difficult to fulfill various diverse requirements using a single numerology, more than one numerology may be adopted. In consideration of standardization efforts, implementation efforts and/or multiplexing capabilities associated with various numerologies it may be beneficial to have a relationship between different numerologies, such as an integral multiple relationship. Various numerology families, such as LTE 15 kHz and/or other numerologies may allow power N of 2 symbols in 1 ms.

In NR, it may be necessary to support more than one value of subcarrier-spacing. Values of subcarrier-spacing may be derived from a value of subcarrier-spacing multiplied by N (e.g., N may be an integer). In a first numerology, subcarrier-spacing values may include 15 kHz subcarrier-spacing (e.g., LTE based numerology). In a second numerology, subcarrier spacing values may include 17.5 kHz subcarrier-spacing with uniform symbol duration including CP length. In a third numerology, subcarrier spacing values may include 17.06 kHz subcarrier-spacing with uniform symbol duration including CP length. In a fourth numerology, subcarrier spacing values may include 21.33 kHz subcarrier-spacing. In some examples, other numerologies are also provided. Alternatively and/or additionally, multiple OFDM numerologies may be assumed to apply to a single frequency range.

NR frame structure, channels and/or numerology design are described below. In some examples, sizes of various fields in the time domain may be expressed in time units (e.g., $T_c = 1/(\Delta f_{max} \cdot N_f)$, where $\Delta f_{max} = 480 \cdot 10^3$ Hz and $N_f = 4096$). Alternatively and/or additionally, for a constant $\kappa = T_s/T_c = 64$, where $T_s = 1/(\Delta f_{ref} \cdot N_{f,ref})$, $\Delta f_{ref} = 15 \cdot 10^3$ Hz and/or $N_{f,ref} = 2048$ may be true.

Figures 5, 6:
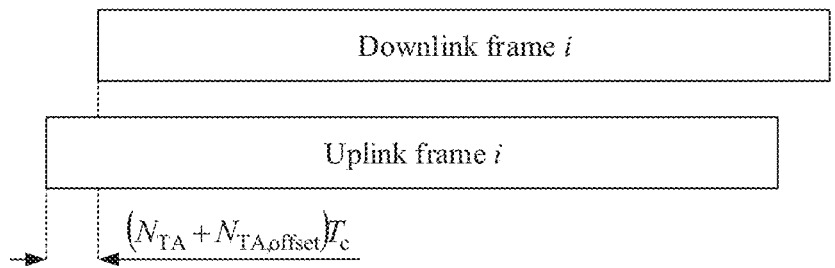
FIG. 5 illustrates a table associated with Orthogonal Frequency Division Multiplexing (OFDM) numerologies.
FIG. 6 illustrates an example of an uplink-downlink timing relationship.

FIG. 5 illustrates a table 500 associated with OFDM numerologies. In some examples, $\mu$ may be indicative of a numerology and/or $\Delta f$ may be indicative of a subcarrier spacing. For example, a first numerology (e.g., $\mu = 0$) may be associated with a first subcarrier spacing (e.g., $\Delta f = 15$ kHz). Alternatively and/or additionally, a second numerology (e.g., $\mu = 1$) may be associated with a second subcarrier spacing (e.g., $\Delta f = 30$ kHz). Alternatively and/or additionally, a third numerology (e.g., $\mu = 2$) may be associated with a third subcarrier spacing (e.g., $\Delta f = 60$ kHz). For example, $\mu$ and/or a CP for a bandwidth part may be given by higher-layer parameters DL-BWP-mu and DL-BWP-cp for downlink (DL) (transmissions), and/or UL-BWP-mu and UL-BWP-cp for uplink (UL) (transmissions).

DL transmissions and/or UL transmissions may be organized into frames with $T_f = (\Delta f_{max} N_f/100) \cdot T_c = 10$ ms duration, each consisting of ten subframes (and/or a different number of subframes) of $T_{sf} = (\Delta f_{max} N_f/1000) \cdot T_c = 1$ ms duration. A number of consecutive OFDM symbols per subframe may be $N_{symb}^{subframe,\mu} = N_{symb}^{slot} N_{slot}^{subframe,\mu}$. Each frame may be divided into two equally-sized half-frames of five subframes each with half-frame 0 consisting of subframes 0-4 and half-frame 1 consisting of subframes 5-9. There may be one set of frames in the uplink and/or one set of frames in the DL on a carrier.

FIG. 6 illustrates an example of a UL-DL timing relationship. Uplink frame number i for transmission from the UE may start a duration of time (e.g., $T_{TA} = (N_{TA} + N_{TA,offset}) T_c$, as illustrated in FIG. 6) before a start of the corresponding DL frame at the UE where $N_{TA,offset}$ depends on a frequency band (associated with 3GPP TS 38.133).

FIG. 7A illustrates a table 700 associated with a number of OFDM symbols per slot, a number of slots per frame and a number of slots per subframe for a normal CP. FIG. 7B illustrates a table 750 associated with a number of OFDM symbols per slot, a number of slots per frame and a number of slots per subframe for an extended CP. For subcarrier spacing configuration $\mu$, slots may be numbered $n_s^\mu \in$ $\{0, \ldots, N_{slot}^{subframe,\mu}-1\}$ in increasing order within a subframe and $n_{s,f}^{\mu} \in \{0, \ldots, N_{slot}^{frame,\mu}-1\}$ in increasing order within a frame. There may be $N_{symb}^{slot}$ consecutive OFDM symbols in a slot where $N_{symb}^{slot}$ depends on the CP associated with the table 700 and/or the table 750. The start of slot $n_s^{\mu}$ in a subframe is aligned in time with the start of OFDM symbol $n_s^{\mu} N_{symb}^{slot}$ in the same subframe.

FIG. 8 illustrates a table 800 associated with slot formats in a normal CP. In some examples, FDM symbols in a slot can be classified as 'downlink' (denoted 'D' in the table 800), 'flexible' (denoted 'X' in the table 800) and/or 'uplink' (denoted 'U' in the table 800). The table 800 may be used when a Slot Format Indicator Radio Network Temporary Identifier (SFI-RNTI) is used for slot format indication (associated with 3GPP TS 38.213, where signaling of slot formats is described). In a slot in a DL frame, a UE may assume that DL transmissions occur in 'downlink' and/or 'flexible' symbols. In a slot in an UL frame, the UE may only transmit in 'uplink' and/or 'flexible' symbols.

A time-continuous signal $S_l^{(p,\mu)}(t)$ on an antenna port p and a subcarrier spacing configuration $\mu$ for an OFDM symbol l in a subframe for a physical channel and/or a signal different than Physical Random Access Channel (PRACH) may be defined by $S_l^{(p,\mu)}(t) = \sum_{k=0}^{N_{grid}^{size,\mu} N_{sc}^{RB}-1} a_{k,l}^{(p,\mu)} \cdot e^{j2\pi(k+k_0^{\mu}-N_{grid}^{size,\mu} N_{sc}^{RB}/2)\Delta f(t-N_{CP,l}^{\mu} T_c - t_{start,l}^{\mu})}$, where $t_{start,l}^{\mu} \le t < t_{start,l}^{\mu} + (N_u^{\mu}+N_{CP,l}^{\mu})T_c$ is associated with a time within the subframe. Alternatively and/or additionally, one or more of the following equations may be applied:

$$N_u^{\mu} = 2048\kappa \cdot 2^{-\mu} \text{ and/or}$$

$$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix,} \quad l=0 \text{ or } l=7\cdot 2^{\mu} \\ 144\kappa \cdot 2^{-\mu} & \text{normal cyclic prefix,} \quad l \ne 0 \text{ and } l \ne 7\cdot 2^{\mu} \end{cases}$$

A starting position $t_{start,l}^{\mu}$ of the OFDM symbol may be defined as $$t_{start,l}^{\mu} = \begin{cases} 0 & l=0 \\ t_{start,l-1}^{\mu} + (N_u^{\mu} + N_{CP,l-1}^{\mu}) \cdot T_c & \text{otherwise} \end{cases}$$

A value $k_0^{\mu} \in \{-6, 0, +6\}$ may be obtained from a higher-layer parameter k0 and/or may be configured such that a lowest numbered subcarrier in a common resource block for the subcarrier spacing configuration $\mu$ coincides with a lowest numbered subcarrier in a common resource block for a (and/or any) subcarrier spacing configuration less than $\mu$.

A time-continuous signal $s_l^{(p,\mu)}(t)$ on an antenna port p and a subcarrier spacing configuration $\mu$ for an OFDM symbol l in a subframe for a physical channel and/or signal different than PRACH may be defined by $$s_l^{(p,\mu)}(t) = \sum_{k=0}^{L_{RA}-1} a_k^{(p,RA)} \cdot e^{j2\pi(k+Kk_1+\bar{k})\Delta f_{RA}(t-N_{CP,l}^{RA} T_c - t_{start}^{RA})}, \text{ where}$$

$$K = \Delta f / \Delta f_{RA},$$

$$k_1 = k_0^{\mu} + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2 \text{ and/or}$$

$$t_{start}^{RA} \le t < t_{start}^{RA} + (N_u + N_{CP,l}^{RA})T_c$$

may be true.

$\Delta f$ may be a subcarrier spacing of an initial active uplink bandwidth part during initial access. Alternatively and/or additionally, $\Delta f$ may be the subcarrier spacing of an active uplink bandwidth part separate from initial access. Alternatively and/or additionally, $k_0^{\mu} \in \{-6, 0, +6\}$ may be obtained from the higher-layer parameter k0 and/or may be configured such that a lowest numbered subcarrier in a common resource block for the subcarrier spacing configuration $\mu$ coincides with a lowest numbered subcarrier in a common resource block for a (and/or any) subcarrier spacing configuration less than $\mu$.

Alternatively and/or additionally, $N_{BWP,i}^{start}$ may be a lowest numbered resource block of the initial active uplink bandwidth part based upon common resource block indexing and/or may be derived by a higher-layer parameter initial-UL-BWP during initial access. Alternatively and/or additionally, $N_{BWP,i}^{start}$ is a lowest numbered resource block of the active uplink bandwidth part based upon common resource block indexing and/or may be derived by a higher-layer parameter UL-BWP of an active uplink bandwidth part separate from initial access.

Alternatively and/or additionally, $n_{RA}^{start}$ is a frequency offset of a lowest PRACH transmission occasion in a frequency domain with respect to PRB 0 of the initial active uplink bandwidth part given by a higher-layer parameter prach-frequency-start during initial access associated with the initial active uplink bandwidth part. Alternatively and/or additionally, $n_{RA}^{start}$ is a frequency offset of a lowest PRACH transmission occasion in the frequency domain with respect to PRB 0 of the active uplink bandwidth part given by the higher-layer parameter prach-frequency-start associated with the active uplink bandwidth part separate from initial access.

Alternatively and/or additionally, $n_{RA}$ is a PRACH transmission occasion index in the frequency domain for a given PRACH transmission occasion in one time instance. Alternatively and/or additionally, $N_{RB}^{RA}$ is a number of resource blocks occupied and is given by a parameter allocation expressed in number of RBs for PUSCH.

$t_{start}^{RA}$ may correspond to a starting position of the PRACH preamble. The subframe may (be assumed to) start at t=0. Alternatively and/or additionally, a timing advanced value may (be assumed to) be $N_{TA}=0$ Alternatively and/or additionally, l may be associated with a starting symbol parameter.

In some examples, $N_{CP,l}^{RA} = N_{CP}^{RA} + n \cdot 16\kappa$ may be true. In cases where $\Delta f_{RA} \in \{1.25, 5\}$ kHz, n may be equal to 0. Alternatively and/or additionally, in cases where $\Delta f_{RA} \in \{15, 30, 60, 120\}$ kHz, n may be a number of times that an interval $\lfloor t_{start}^{RA}, t_{start}^{RA} + (N_u^{RA} + N_{CP}^{RA})T_c \rfloor$ overlaps with a time instance 0 and/or a time instance $(\Delta f_{max} N_f/2000) \cdot T_c = 0.5$ ms in a subframe.

FIG. 9 illustrates a table 900 associated with a starting position for an exemplary PRACH preamble where $\Delta f_{RA} \in \{1.25, 5, 15, 30\}$ kHz. FIG. 10 illustrates a table 1000 associated with a starting position for an exemplary PRACH preamble where $\Delta f_{RA} \in \{60, 120\}$ kHz.

RAT and/or NR (associated with 5G) may accommodate a wide range of services. Accordingly, traffic may have various requirements. For example, one or more types of traffic (e.g., eMBB and/or other (conventional) mobile network traffic), may be associated with large amounts of data and/or less strict latency requirements. Alternatively and/or additionally, one or more other types of traffic (e.g., Ultra Reliable and Low Latency Communication (URLLC)) may be associated with smaller amounts of data and/or stricter latency and/or reliability requirements. Semi-statically splitting time resources and/or frequency resources for different types of traffic may inhibit resource utilization of the base station because arrival of data and/or a type of the data is difficult to predict. Accordingly, a base station may attempt to schedule data traffic on available resources. For example, if data associated with delay sensitive services (e.g., data associated with URLLC) arrives at the base station, the base station may release one or more resources scheduled for data associated with delay tolerant services (e.g., data associated with eMBB). A UE associated with (and/or receiving) the delay tolerant services may need to know that the one or more resources scheduled for the UE has been released and perform one or more proper actions (e.g., perform data decoding correctly). For example, a preemption indication, used for DL traffic, may be transmitted to the UE. For example, a UE receiving DL data (for eMBB) may monitor (for) a preemption indication to determine whether one or more scheduled resources for the DL data is preempted. In some examples, the preemption indication may be carried on group common Physical Downlink Control Channel (PDCCH).

In some examples, a UE may be configured with an Interruption Radio Network Temporary Identifier (INT-RNTI) provided by a higher layer parameter INT-RNTI for monitoring PDCCH conveying DCI format 2_1 if the UE is provided a higher layer parameter Preemp-DL and Preemp-DL=ON. Alternatively and/or additionally, the UE may be configured with a set of serving cells by a higher layer parameter INT-cell-to-INT, a mapping for each serving cell in the set of serving cells to a field in DCI format 2_1 by a higher layer parameter cell-to-INT, an information payload size for DCI format 2_1 by higher layer parameter INT-DCI-payload-length and/or an indication granularity for time-frequency resources by a higher layer parameter INT-TF-unit for each serving cell in the set of serving cells.

Alternatively and/or additionally, if a UE detects a DCI format 2_1 for a serving cell from the set of serving cells, the UE may assume that no transmission to the UE is present in PRBs and in symbols, from a set of PRBs and a set of symbols of the last monitoring period, that are indicated by the DCI format 2_1. The indication by the DCI format 2_1 may not be applicable to reception of SS/PBCH blocks.

The set of PRBs may be equal to an active DL Bandwidth Part (BWP) and/or may include $B_{INT}$ PRBs. In some examples, if a UE detects a DCI format 2_1 in a PDCCH transmitted in a control resource set in a slot, the set of symbols indicated by a field in DCI format 2_1 includes the last $N_{symb}^{slot} \cdot T_{INT} \cdot 2^{\mu-\mu_{INT}}$ symbols prior to the first symbol of the control resource set in the slot, where $T_{INT}$ may be a value of a higher layer parameter Monitoring-periodicity-PDCCH-slot, $N_{symb}^{slot}$ may be a number of symbols per slot, $\mu$ may correspond to a subcarrier spacing configuration (and/or a numerology) for a serving cell with mapping to a respective field in the DCI format 2_1, $\mu_{INT}$ may correspond to a subcarrier spacing configuration of a DL BWP (and/or a numerology) where the UE receives the PDCCH conveying the DCI format 2_1, and/or m may be a natural number. If the UE is configured with higher layer parameters UL-DL-configuration-common and/or UL-DL-configuration-common-Set2, symbols indicated as uplink by UL-DL-configuration-common or UL-DL-configuration-common-Set2 may be excluded from the last $N_{symb}^{slot} \cdot T_{INT} \cdot 2^{\mu-\mu_{INT}}$ symbols prior to the first symbol of the control resource set in the slot. A resulting set of symbols includes a number of symbols that is denoted as $N_{INT}$.

In some examples, the UE may not be expected to be provided values of $\mu$, $\mu_{INT}$, and $T_{INT}$ which result in a value of $N_{symb}^{slot} \cdot T_{INT} \cdot 2^{\mu-\mu_{INT}}$ not being an integer.

Alternatively and/or additionally, the UE may be provided indication granularity for the set of PRBs and/or for the set of symbols by a higher layer parameter INT-TF-unit. In some examples, if a value of INT-TF-unit is 0, 14 bits of a field in DCI format 2_1 have a one-to-one mapping with 14 groups of consecutive symbols from the set of symbols where each of first $N_{INT} - \lfloor N_{INT}/14 \rfloor \cdot 14$ symbol groups includes $\lceil N_{INT}/14 \rceil$ symbols, each of last $14 - N_{INT} + \lfloor N_{INT}/14 \rfloor \cdot 14$ symbol groups includes $\lfloor N_{INT}/14 \rfloor$ symbols, a bit value of 0 indicates transmission to the UE in the symbol group and a bit value of 1 indicates no transmission to the UE in the corresponding symbol group.

Alternatively and/or additionally, if the value of INT-TF-unit is 1, 7 pairs of bits of a field in the DCI format 2_1 have a one-to-one mapping with 7 groups of consecutive symbols where each of the first $N_{INT} - \lfloor N_{INT}/7 \rfloor \cdot 7$ symbol groups includes $\lceil N_{INT}/7 \rceil$ symbols, each of the last $7 - N_{INT} + \lfloor N_{INT}/7 \rfloor \cdot 7$ symbol groups includes $\lfloor N_{INT}/7 \rfloor$ symbols, a first bit in a pair of bits for a symbol group is applicable to a subset of first $\lceil B_{INT}/2 \rceil$ PRBs from the a of $B_{INT}$ PRBs, a second bit in the pair of bits for the symbol group is applicable to a subset of last $\lfloor B_{INT}/2 \rfloor$ PRBs from the set of $B_{INT}$ PRBs, a bit value of 0 indicates transmission to the UE in the symbol group and subset of PRBs, and a bit value of 1 indicates no transmission to the UE in the corresponding symbol group and subset of PRBs.

If the UE is configured with a Secondary Cell Group (SCG), the UE may apply and/or perform one or more procedures associated with a Master Cell Group (MCG) and/or the SCG. In some examples, in association with procedures that are applied for the MCG, the terms 'secondary cell', 'secondary cells', 'serving cell' and/or 'serving cells' may refer to secondary cell, secondary cells, serving cell and/or serving cells associated with the MCG, respectively. In some examples, in association with procedures that are applied for the SCG, the terms 'secondary cell', 'secondary cells', 'serving cell' and/or 'serving cells' may refer to secondary cell, secondary cells (not including Primary Secondary Cell (PSCell)), serving cell and/or serving cells associated with the SCG, respectively. Alternatively and/or additionally, the term 'primary cell" may refer to the PSCell of the SCG.

In some examples, a UE may monitor a set of PDCCH candidates in one or more control resource sets on the active DL BWP on each activated serving cell according to corresponding search spaces where monitoring implies decoding each PDCCH candidate according to monitored Downlink Control Information (DCI) formats. A UE may be configured by a higher layer parameter SSB-periodicityServing-Cell (e.g., a periodicity of half frames for reception of Synchronization Signal (SS)/Physical Broadcast Channel (PBCH) blocks in a serving cell).

In some examples, the UE may perform one or more operations associated with monitoring of a PDCCH candidate. In some examples, if the UE has received SSB-transmitted-SIB1 and/or has not received SSB-transmitted for a serving cell and/or if at least one Resource Element (RE) for monitoring a PDCCH candidate for a DCI format with cyclic redundancy check (CRC) not scrambled by SI-RNTI on the serving cell overlaps with at least one RE corresponding to a SS/PBCH block index provided by SSB-transmitted-SIB1, the UE is not required to monitor the PDCCH candidate. Alternatively and/or additionally, if the UE has received SSB-transmitted for a serving cell and/or if at least one RE for monitoring a PDCCH candidate for a DCI format with CRC not scrambled by SI-RNTI on the serving cell overlaps with one or more (respective) REs corresponding to a SS/PBCH block index provided by SSB-transmitted, the UE is not required to monitor the PDCCH candidate. Alternatively and/or additionally, if the UE has not received both SSB-transmitted-SIB1 and SSB-transmitted for a serving cell and if the UE monitors the PDCCH candidate for a Type0-PDCCH common search space on the serving cell, the UE may assume that no SS/PBCH block is transmitted in REs used for monitoring the PDCCH candidate on the serving cell.

In some examples, if a carrier aggregation capability for a UE, as included in UE-NR-Capability, is larger than 4, the UE includes an indication in UE-NR-Capability for a maximum number of PDCCH candidates the UE can monitor per slot when the UE is configured for carrier aggregation operation over more than 4 cells. When the UE is configured for carrier aggregation operation over more than 4 cells, the UE is not expected to be configured with a number of PDCCH candidates to monitor per slot that is larger than the maximum number.

PDCCH search spaces may correspond to a set of PDCCH candidates for a UE to monitor. A search space may be a common search space and/or a UE-specific search space (e.g., specific to the UE). The UE may monitor PDCCH candidates in one or more of the following search spaces: a Type0-PDCCH common search space for a DCI format with CRC scrambled by a System Information (SI) Radio Network Temporary Identifier (RNTI) on a primary cell; a Type0A-PDCCH common search space for a DCI format with CRC scrambled by a SI-RNTI on a primary cell; a Type1-PDCCH common search space for a DCI format with CRC scrambled by a Random Access RNTI (RA-RNTI), a Temporary Cell RNTI (TC-RNTI), and/or a Cell RNTI (C-RNTI) on a primary cell; a Type2-PDCCH common search space for a DCI format with CRC scrambled by a Paging RNTI (P-RNTI) on a primary cell; a Type3-PDCCH common search space for a DCI format with CRC scrambled by INT-RNTI, Slot Format Indicator (SFI) RNTI (SFI-RNTI), Transmit Power Control (TPC) PRACH RNTI (TPC-PRACH-RNTI), TPC Physical Uplink Control Channel (PUCCH) RNTI (TPC-PUCCH-RNTI), TPC Sounding Reference Signal (SRS) RNTI (TPC-SRS-RNTI), C-RNTI, one or more Configured Scheduling (CS) RNTIs (CS-RNTIs) and/or Semi-Persistent (SP) Channel State Information (CSI) RNTI (SP-CSI-RNTI); and/or a UE-specific search space for a DCI format with CRC scrambled by C-RNTI, one or more CS-RNTIs and/or SP-CSI-RNTI.

FIG. 11 illustrates a table 1100 associated with Control Channel Element (CCE) aggregation levels and/or a number of PDCCH candidates per CCE aggregation level. A UE may be provided a configuration for a control resource set for a Type0-PDCCH common search space by a higher layer parameter RMSI-PDCCH-Config and/or a subcarrier spacing by a higher layer parameter RMSI-scs for PDCCH reception. The UE may determine the control resource set and/or monitoring occasions for a Type0-PDCCH common search space. The Type0-PDCCH common search space is defined by CCE aggregation levels and/or a number of PDCCH candidates per CCE aggregation level presented in table 1100. The control resource set configured for the Type0-PDCCH common search space has control resource set index 0. The Type0-PDCCH common search space has search space index 0.

A control resource set associated with the Type0A-PDCCH common search space and/or for the Type2-PDCCH common search space may be the same as the control resource set for the Type0-PDCCH common search space. A UE is provided a configuration for the Type0A-PDCCH common search space by a higher layer parameter osi-SearchSpace and/or the CCE aggregation levels and the number of PDCCH candidates per CCE aggregation level is presented in table 1100. The UE may be provided a configuration for the Type2-PDCCH common search space by a higher layer parameter paging-SearchSpace. The CCE aggregation levels and the number of PDCCH candidates per CCE aggregation level are presented in table 1100.

For the Type1-PDCCH common search space, a UE may be provided a configuration for a control resource set by a higher layer parameter rach-coreset-configuration and/or a configuration for a search space by a higher layer parameter ra-SearchSpace. If a higher layer parameter rach-coreset-configuration is not provided to the UE, the control resource set for the Type1-PDCCH common search space is the same as for the Type0-PDCCH common search space.

If a UE is not provided a higher layer parameter osi-SearchSpace for the Type0A-PDCCH common search space, an association between monitoring occasions for the Type0A-PDCCH common search space and the SS/PBCH block index is the same as an association of monitoring occasions associated with the Type0-PDCCH common search space.

If a UE is not provided a higher layer parameter paging-SearchSpace for the Type2-PDCCH common search space, an association between monitoring occasions for the Type2-PDCCH common search space and the SS/PBCH block index is the same as an association of monitoring occasions associated with the Type0-PDCCH common search space.

If a UE is not provided a higher layer parameter ra-SearchSpace for the Type1-PDCCH common search space, an association between monitoring occasions for the Type1-PDCCH common search space and the SS/PBCH block index is the same as an association of monitoring occasions associated with the Type0-PDCCH common search space.

The UE may assume that a Demodulation Reference Signal (DM-RS) antenna port associated with PDCCH reception in the Type0-PDCCH common search space, the Type0A-PDCCH common search space and/or the Type2-PDCCH common search space, and/or for corresponding Physical Downlink Shared Channel (PDSCH) receptions and/or a DM-RS antenna port associated with SS/PBCH reception are quasi co-located with respect to delay spread, Doppler spread, Doppler shift, average delay, and spatial Rx parameters. Alternatively and/or additionally, a value for a DM-RS scrambling sequence initialization is a cell ID.

A subcarrier spacing and/or a CP length for PDCCH reception with the Type0A-PDCCH common search space, the Type1-PDCCH common search space, and/or the Type2-PDCCH common search space may be the same as for PDCCH reception with the Type0-PDCCH common search space.

A UE may assume that a DM-RS antenna port associated with PDCCH reception and/or PDSCH reception in the Type1-PDCCH common search space are quasi co-located with an SS/PBCH block identified in an initial access procedure and/or with a received CSI-RS with respect to delay spread, Doppler spread, Doppler shift, average delay and/or spatial Rx parameters (when applicable).

If a value for a DM-RS scrambling sequence initialization for the Type0A-PDCCH common search space, the Type1-PDCCH common search space and/or the Type2-PDCCH common search space is not provided by a higher layer parameter PDCCH-DMRS-Scrambling-ID in SystemInformationBlockType1, the value is a cell ID.

If a UE is configured for downlink bandwidth part (BWP) operation, one or more of the above configurations for the common search spaces apply for the initial active DL BWP. Alternatively and/or additionally, the UE can be additionally configured a control resource set for the Type0-PDCCH common search space, the Type0A-PDCCH common search space, the Type1-PDCCH common search space and/or the Type2-PDCCH common search space for each configured DL BWP on the primary cell, other than an initial active DL BWP.

In some examples, for each DL BWP configured to a UE in a serving cell, a UE may be provided by higher layer signalling with P control resource sets where P≤3. For control resource set p, 0≤p<P, the higher layer signalling may provide one or more of: a control resource set index by a higher layer parameter CORESET-ID; a DM-RS scrambling sequence initialization value provided by a higher layer parameter PDCCH-DMRS-Scrambling-ID; a number of consecutive symbols provided by a higher layer parameter CORESET-time-duration; a set of resource blocks provided by a higher layer parameter CORESET-freq-dom; a CCE-to-REG mapping provided by a higher layer parameter CORESET-CCE-to-REG-mapping-type; a Resource Element Group (REG) bundle size, in case of interleaved CCE-to-REG mapping, provided by a higher layer parameter CORESET-REG-bundle-size; a cyclic shift for a REG bundle interleaver provided by a higher layer parameter CORESET-shift-index; an antenna port quasi co-location, from a set of antenna port quasi co-locations provided by a higher layer parameter TCI-StatesPDCCH, indicating quasi co-location information of the DM-RS antenna port for PDCCH reception; and/or an indication for a presence or absence of a transmission configuration indication (TCI) field for DCI format 1_0 or DCI format 1_1 transmitted by a PDCCH in control resource set p, by a higher layer parameter TCI-PresentInDCI.

In some examples, for each control resource set in a DL BWP of a serving cell, a respective higher layer parameter CORESET-freq-dom provides a bitmap. Bits of the bitmap have a one-to-one mapping with non-overlapping groups of 6 PRBs, in ascending order of the PRB index in the DL BWP bandwidth of $N_{RB}^{BWP}$ PRBs with starting position $N_{BWP}^{start}$ where the first PRB of the first group of 6 PRBs has index $6 \cdot \lceil N_{BWP}^{start}/6 \rceil$. A group of 6 PRBs is allocated to a control resource set if a corresponding bit value in the bitmap is 1. Alternatively and/or additionally, if a corresponding bit value in the bitmap is 0, the group of 6 PRBs is not allocated to the control resource set.

Alternatively and/or additionally, if a UE has received initial configuration of more than one TCI states by a higher layer parameter TCI-StatesPDCCH containing the more than one TCI states but has not received a MAC CE activation for one or more of the more than one TCI states, the UE may assume that the DM-RS antenna port associated with PDCCH reception in the UE-specific search space is quasi co-located with an SS/PBCH block the UE identified during an initial access procedure with respect to delay spread, Doppler spread, Doppler shift, average delay and/or spatial Rx parameters.

Alternatively and/or additionally, if a UE has received a higher layer parameter TCI-StatesPDCCH containing a single TCI state, the UE may that a DM-RS antenna port associated with PDCCH reception in a UE-specific search space is quasi co-located with one or more DL RSs configured by the TCI state.

In some examples, for each DL BWP of a serving cell where a UE is configured to monitor PDCCH in a search space, the UE is configured with an association between a search space set index S, 0≤s<S, where S≤10, and a control resource set index p by a higher layer parameter search-space-config. Alternatively and/or additionally, for the search space set S in the control resource set p, the UE may be configured with one or more of the following by the higher layer parameter search-space-config (and/or one or more different higher layer parameters): an indication that the search space set is a common search space set or a UE-specific search space set by a higher layer parameter Common-search-space-flag; if the search space set S is for a common search space, an indication by a higher layer parameter RNTI-monitoring to monitor PDCCH for one or more of DCI format 0_0 and DCI format 1_0 with CRC scrambled by a RNTI from RNTIs, DCI format 2_0, DCI format 2_1, DCI format 2_2 and/or DCI format 2_3; if the search space set S is a UE-specific search space, an indication by higher layer parameter USS-DCI-format to monitor PDCCH either for DCI format 0_0 and DCI format 1_0, and/or for DCI format 0_1 and DCI format 1_1; a number of PDCCH candidates $M_{p,s}^{(L)}$ per CCE aggregation level L by higher layer parameters aggregationLevel1, aggregationLevel2, aggregationLevel4, aggregationLevel8 and/or aggregationLevel16, for CCE aggregation level 1, CCE aggregation level 2, CCE aggregation level 4, CCE aggregation level 8 and/or CCE aggregation level 16 (respectively); a PDCCH monitoring periodicity of $k_{p,s}$ slots by a higher layer parameter monitoringSlotPeriodicityAndOffset; a PDCCH monitoring offset of $o_{p,s}$ slots, where $0 \leq o_{p,s} < k_{p,s}$, by a higher layer parameter monitoringSlotPeriodicityAndOffset; and/or a PDCCH monitoring pattern within a slot, indicating one or more first symbols of the control resource set within a slot for PDCCH monitoring, by a higher layer parameter monitoringSymbolsWithinSlot.

In some examples, if the higher layer parameter monitoringSymbolsWithinSlot indicates to a UE only one PDCCH monitoring occasion within a slot, the UE may not be expected to be configured (with) a corresponding search space set S for a PDCCH subcarrier spacing other than 15 kHz (and/or a different frequency) if the control resource set p associated with the search space S includes at least one symbol after the third slot symbol.

Alternatively and/or additionally, for a subcarrier spacing of 15 KHz (and/or the different frequency), if the higher layer parameter monitoringSymbolsWithinSlot for a search space set S indicates to the UE merely one PDCCH monitoring occasion in a slot for a corresponding control resource set p and the control resource set p includes at least one symbol after the third slot symbol, the UE may expect that all control resource sets configured to the UE are located within at most three (same) consecutive symbols in the slot.

In some examples, a UE may determine a PDCCH monitoring occasion from a PDCCH monitoring periodicity, a PDCCH monitoring offset and/or a PDCCH monitoring pattern within a slot. For a search space set S in a control resource set p, the UE may determine that one or more PDCCH monitoring occasions exists in a slot associated with a number $n_{s,f}^{\mu}$ in a frame associate with a number $n_f$ if $(n_f N_{slot}^{frame,\mu} + n_{s,f}^{\mu} - o_{p,s}) \bmod k_{p,s} = 0$ is true.

In some examples, a PDCCH UE-specific search space $S_{k_{p,s}}^{(L)}$ at CCE aggregation level L∈{1, 2, 4, 8, 16} may be defined by a set of PDCCH candidates for CCE aggregation level L.

In some examples, if a UE is configured with a higher layer parameter CrossCarrierSchedulingConfig for a serving cell, the carrier indicator field value may correspond to a value indicated by CrossCarrierSchedulingConfig.

In some examples, for a DL BWP of a serving cell on which a UE monitors PDCCH candidates in a UE-specific search space, if the UE is not configured with a carrier indicator field, the UE may monitor the PDCCH candidates without the carrier indicator field. Alternatively and/or additionally, for a serving cell on which a UE monitors PDCCH candidates in a UE-specific search space, if a UE is configured with a carrier indicator field, the UE may monitor the PDCCH candidates with the carrier indicator field.

In some examples, a UE may not be expected to monitor PDCCH candidates on a DL BWP of a secondary cell if the UE is configured to monitor PDCCH candidates with a carrier indicator field corresponding to that secondary cell in another serving cell. For a DL BWP of a serving cell on which the UE monitors PDCCH candidates, the UE may monitor PDCCH candidates (at least) for the same serving cell.

FIG. 12 illustrates a table 1200 associated with a maximum number of PDCCH candidates, $M_{PDCCH}^{max,slot}$, per slot and/or per serving cell as a function of a subcarrier spacing value (e.g., $2^\mu \cdot 15$ kHz) where $\mu \in \{0,1,2,3\}$. In some examples, the maximum number of PDCCH candidates may be associated with CCE aggregation levels and/or DCI formats with different sizes in a search space that a UE is expected to monitor.

FIG. 13 illustrates a table 1300 associated with a maximum number of non-overlapped CCEs, $C_{PDCCH}^{max,slot}$, per slot and/or per serving cell as a function of a subcarrier spacing value (e.g., $2^\mu \cdot 15$ kHz) where $\mu \in \{0,1,2,3\}$, in cases where a higher layer parameter Monitoring-symbols-PDCCH-within-slot is indicative of merely one PDCCH monitoring occasion within a slot. Alternatively and/or additionally, CCEs may be non-overlapped if the CCEs are associated with different control resource set indexes and/or if the CCEs are associated with different first symbols for reception of respective PDCCH candidates.

In some examples, $S_{css}$ may be associated with a set of search space sets $s_{css}$ for common search spaces in a corresponding set $P_{css}$ of control resource sets $P_{css}$ and/or $S_{uss}$ may be associated with a set of search space sets $s_{uss}$ for UE-specific search spaces in a corresponding set $P_{uss}$ of control resource sets $p_{uss}$ where a UE monitors PDCCH candidates in a slot. In some examples, if $$\sum_{\substack{s_{css} \in S_{css} \\ p_{css} \in P_{css}}} \sum_L M_{P_{css},s_{css}}^{(L)} + \sum_{\substack{s_{uss} \in S_{uss} \\ p_{uss} \in P_{uss}}} \sum_L M_{P_{uss},s_{uss}}^{(L)} > M_{PDCCH}^{max,slot}$$

is true, the UE may monitor $$M_{PDCCH}^{css} = \min\left(M_{PDCCH}^{max,slot}, \sum_{\substack{s_{css} \in S_{css} \\ p_{css} \in P_{css}}} \sum_L M_{P_{css},s_{css}}^{(L)}\right)$$

PDCCH candidates for the common search spaces and/or the UE may monitor $M_{PDCCH}^{uss} = M_{PDCCH}^{max,slot} - M_{PDCCH}^{css}$ PDCCH candidates for the UE-specific search spaces in the slot.

Alternatively and/or additionally, for a search space set S associated with control resource set p, CCE indexes for aggregation level L corresponding to PDCCH candidate $m_{s,n_{CI}}$ of a search space set in slot $n_{s,f}^\mu$ for a serving cell corresponding to a carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i,$$

where: for a (and/or any) common search space $Y_{p,n_{s,f}^\mu} = 0$ is true; for a UE-specific search space, $Y_{p,n_{s,f}^\mu} = (A_p \cdot Y_{p,n_{s,f}^\mu - 1}) \mod D$, $Y_{p,-1} = n_{RNTI} \neq 0$, $A_0 = 39827$, $A_1 = 39829$, $A_2 = 39839$, and/or $D = 65537$ are true; $i = 0, \ldots, L-1$; $N_{CCE,p}$ is a number of CCEs, numbered from 0 to $N_{CCE,p} - 1$, in a control resource set p; $n_{CI}$ is a carrier indicator field value if the UE is configured with a carrier indicator field by a higher layer parameter CrossCarrierSchedulingConfig for a serving cell on which PDCCH is monitored; if the UE is not configured with a carrier indicator field by a higher layer parameter CrossCarrierSchedulingConfig for a serving cell on which PDCCH is monitored, $n_{CI} = 0$ may be true; $m_{s,n_{CI}} = 0, \ldots, M_{p,s,n_{CI}}^{(L)} - 1$ may be true, where $M_{p,s,n_{CI}}^{(L)}$ is a number of PDCCH candidates the UE is configured to monitor for aggregation level L for a serving cell corresponding to $n_{CI}$ and/or a search space set S; and/or for a (and/or any) common search space, $M_{p,s,max}^{(L)} = M_{p,s,0}^{(L)}$ may be true; and/or for a UE-specific search space, $M_{p,s,max}^{(L)}$ is a maximum of $M_{p,s,n_{CI}}^{(L)}$ over configured $n_{CI}$ values for a CCE aggregation level L of search space set S in the control resource set p.

In some examples, if a (and/or any) CCE index for a PDCCH candidate with index $m_{s,n_{CI},2}$ with aggregation level L in a control resource set p overlaps with a (and/or any) CCE index for a PDCCH candidate with index $m_{s,n_{CI},1}$ with aggregation level L in the control resource set p, where $m_{s,n_{CI},1} < m_{s,n_{CI},2}$, the UE may not be expected to monitor the PDCCH candidate with index $m_{s,n_{CI},2}$.

Alternatively and/or additionally, a UE may not be expected to be configured to monitor DCI format 0_1 and/or DCI format 1_1 in a common search space.

In some examples, a UE configured to monitor PDCCH candidates in a serving cell with a DCI format size with a carrier indicator field and/or a CRC scrambled by a C-RNTI, where the PDCCH candidates may have one or more possible values of a carrier indicator field for the DCI format size, may assume that a PDCCH candidate with the DCI format size may be transmitted in the serving cell in a (and/or any) PDCCH UE specific search space corresponding to a (and/or any) value of the one or more possible values of the carrier indicator field for the DCI format size if the UE includes in UE-NR-Capability an indication for a corresponding capability.

Alternatively and/or additionally, a UE configured with a bandwidth part indicator in DCI format 0_1 and/or DCI format 1_1 may, in case of an active DL BWP and/or of an active UL BWP change, determine DCI information applicable to a new active DL BWP and/or a new UL BWP, respectively.

For unpaired spectrum operation, if a UE is not configured for PUSCH/PUCCH transmission on serving cell $c_2$, the UE may not be expected to monitor a PDCCH on a serving cell $c_1$ if the PDCCH overlaps in time with SRS transmission (including an (and/or any) interruption due to uplink RF retuning time and/or downlink RF retuning time) on a serving cell $c_2$ and/or if the UE is not capable of simultaneous reception and/or transmission on the serving cell $c_1$ and/or the serving cell $c_2$.

In some examples, DCI format 2_1 may be used for notifying one or more PRBs and/or one or more OFDM symbols where a UE may assume no transmission is intended for the UE. The following information may be transmitted by means of the DCI format 2_1 with a CRC scrambled by INT-RNTI: an identifier for DCI formats; and/or one or more pre-emption indications (e.g., Pre-emption indication 1, Pre-emption indication 2, . . . , Pre-emption indication N). A size of DCI format 2_1 may be configurable by higher layers up to 126 bits. Each pre-emption indication may be 14 bits.

FIG. 14 illustrates an exemplary DownlinkPreemption information element 1400. The exemplary DownlinkPreemption information element 1400 may be used to configure the UE to monitor a PDCCH for an INT-RNTI (e.g., interruption).

A group common PDCCH may be indicative of a pre-emption indication. For example, a UE may identify the preemption indication based upon the group common PDCCH (e.g., the group common PDCCH may indicate the preemption indication to the UE). Alternatively and/or additionally, cross carrier scheduling associated with a preemption indication may be configured. For example, a group common PDCCH on a first cell may be indicative of a preemption indication on a second cell.

Alternatively and/or additionally, a monitoring periodicity of the group common PDCCH may be configured by a base station. For example, the monitoring periodicity may be associated with a first slot length (e.g., number of slots) associated with the first cell. For example, the first slot length associated with the monitoring periodicity may be (set to) a length of 1 slot, a length of 2 slots and/or a length of 4 slots (and/or a length of a different number of slots), wherein a slot associated with the first cell is associated with the first slot length. However, a second slot length associated with the second cell may be different than the first slot length of the first cell (e.g., the second slot length associated with the second cell may be associated with a slot covering 0.5 ms and/or the first slot length of the first cell may be associated with a slot covering 1 ms) Alternatively and/or additionally, a first number of symbols (e.g., a quantity of symbols, such as OFDM symbols), associated with the first cell, covered by the (single) monitoring periodicity may be different than a second number of symbols (e.g., a quantity of symbols, such as OFDM symbols), associated with the second cell, covered by the (single) monitoring periodicity. For example, the first cell may be associated with a first numerology and/or a first subcarrier spacing and/or the second cell may be associated with a second numerology and/or a second subcarrier spacing. In an example, the first numerology and/or the first subcarrier spacing of the first cell may be associated with 15 KHz and/or the (single) monitoring periodicity associated with the first cell may be about 1 ms. Alternatively and/or additionally, the (single) monitoring periodicity associated with the first cell may comprise 14 symbols (e.g., OFDM symbols) associated with the first cell. The second numerology and/or the second subcarrier spacing may be associated with 30 KHz and/or the (single) monitoring periodicity may comprise 28 symbols (e.g., OFDM symbols) associated with the second cell (e.g., due to the first numerology and/or the first subcarrier spacing of the first cell being associated with 15 KHz and/or the second numerology and/or the second subcarrier spacing being associated with 30 KHz). Alternatively and/or additionally, a slot associated with a numerology and/or a subcarrier spacing may comprise 14 symbols associated with the numerology and/or the subcarrier spacing.

In some examples, the second number of symbols associated with the second cell (e.g., a single monitoring periodicity of a preemption indication) may be determined based upon $N_{symb}^{slot} \cdot T_{INT} \cdot 2^{\mu - \mu_{INT}}$, where $T_{INT}$ is a value of a higher layer parameter Monitoring-slot periodicity-PDCCH-slot (and/or a different higher layer parameter), $N_{symb}^{slot}$ is a number of symbols per slot, (e.g., 14), $\mu$ is a numerology associated with the second cell (indicative of a subcarrier spacing configuration of the second cell) and/or $\mu_{INT}$ is a numerology associated with the first cell (indicative of a subcarrier spacing configuration of a DL BWP on the first cell).

In an example where $\mu$ is equal to 1 (e.g., being $\mu$ equal to 1 may be indicative of the second cell being configured with 30 KHz), $\mu_{INT}$ is equal to 0 (e.g., $\mu_{INT}$ being equal to 0 may be indicative of (a BWP of) the first cell being configured with 15 KHz) and/or $T_{INT}$ is equal to 1, the second number of symbols covered by a single monitoring periodicity associated with the second cell may be 28. Alternatively and/or additionally, in an example where $\mu$ is equal to 0 (e.g., being $\mu$ equal to 0 may be indicative of the second cell being configured with 15 KHz), $\mu_{INT}$ is equal to 1 (e.g., $\mu_{INT}$ being equal to 1 may be indicative of (a BWP of) the first cell being configured with 30 KHz) and/or $T_{INT}$ is equal to 1, the second number of symbols covered by a single monitoring periodicity associated with the second cell may be 7.

In some examples, one or more resources indicated by a preemption indication (e.g., a single preemption indication) may be associated with a monitoring periodicity (e.g., a single monitoring periodicity). For example, the one or more resources may be within the monitoring periodicity. In the example where $\mu$ is equal to 0 (e.g., the second cell is configured with 15 KHz), $\mu_{INT}$ is equal to 1 (e.g., (a BWP of) the first cell is configured with 30 KHz) and/or $T_{INT}$ is equal to 1, a field (e.g., a single field) associated with a first format (e.g., DCI format 2_1) may be indicative of a preemption indication associated with 7 symbols (e.g., 7 OFDM symbols).

In some examples, if a value of a higher layer parameter INT-TF-unit is 0, a bit in the field (associated with the first format (e.g., DCI format 2_1)) may be associated with a symbol (e.g., a single symbol) and/or the bit may be indicative of whether the symbol is preempted (and/or whether one or more other symbols are preempted). In a first example, the bit may indicate that the symbol is preempted (and/or that the one or more other symbols are preempted). In a second example, the bit may indicate that the symbol is not preempted (and/or that the one or more other symbols are not preempted).

The first format (e.g., DCI format 2_1) may be associated with a size (e.g., the size may be associated with a number of bits of the field and/or a number of symbols of the field) and/or a starting position of the field. In some examples, the size (associated with the first format (e.g., DCI format 2_1) and/or indicated by one or more higher layer parameters, such as dci-PayloadSize in a DownlinkPremption information element) is a multiple of 14 (e.g., there may be 14 bits and/or 14 symbols in the field, there may be 28 bits and/or 28 symbols in the field, etc.). Alternatively and/or additionally, the starting position is a multiple of 14 (which may be indicated by one or more higher layer parameters, such as positionInDCI in a DownlinkPremption information element).

Accordingly, one or more bits of the field (e.g., the field may be associated with 14 bits) cannot be used (and/or cannot be utilized). In an example where a preemption indication associated with the field is associated with 7 symbols and/or the field is indicative of the preemption indication being associated with 7 symbols, a first set of 7 symbols of the field may be utilized and/or a second set of 7 symbols of the field may not be utilized. Alternatively and/or additionally, if a base station indicates a size and/or a starting position of the field that are not multiples of 14 (e.g., 7, 15, 20, etc. are not multiples of 14) and/or if the base station transmits instructions associated with a configuration where the size and/or the starting position of the field that are not multiples of 14, the UE may not (and/or cannot) comply with the configuration in accordance with the first format (e.g., DCI format 2_1) and/or one or more standards. Thus, errors may occur and/or reconfiguration failure associated with the UE may occur. For example, the UE may perform one or more operations associated with reconfiguration failure (e.g., the one or more operations may comprise one or more of considering reconfiguration failure, performing a connection re-establishment procedure, etc.).

In a first example, a size of DCI associated with a preemption indication (e.g., DCI for one or more preemption indications) and/or a starting position of a field associated with the preemption indication may be an integer that is not a multiple of 14. Alternatively and/or additionally, the size of the DCI associated with the preemption indication may be an integer (and/or any integer) between 0 and a maximum size value. Alternatively and/or additionally, the starting position of the field associated with the preemption indication may be an integer (and/or any integer) between 0 and a maximum starting position value. In some examples, the maximum size value and/or the maximum starting position value may be comprised within a database. For example, a UE may determine the maximum size value and/or the maximum starting position value by accessing the database. Alternatively and/or additionally, the size of the DCI associated with the preemption indication and/or the starting position of the field associated with the preemption indication may be a multiple of 6. Alternatively and/or additionally, the size of the DCI associated with the preemption indication and/or the starting position of the field associated with the preemption indication may be a multiple of 12.

In a second example, a base station may set a value of a first higher layer parameter (e.g., the higher layer parameter INT-TF-unit, which may be associated with timeFrequencySet in a DownlinkPremption information element) to 1 if a number of symbols (e.g., a number of OFDM symbols) associated with a monitoring periodicity of a preemption indication is 7. Alternatively and/or additionally, the base station is not allowed to (and/or is not configured to) set the value of the first higher layer parameter to 0 if the number of symbols associated with the monitoring periodicity of the preemption indication is 7. In some examples, the number of symbols may be related to (and/or configured based upon) a numerology and/or a subcarrier spacing of a cell. Alternatively and/or additionally, the number of symbols may be counted in accordance with one or more symbols associated with the numerology and/or the subcarrier spacing of the cell.

In some examples, setting the value of the first higher layer parameter (e.g., the higher layer parameter INT-TF-unit, which may be associated with timeFrequencySet in the DownlinkPremption information element) to 1 may be associated with two bits (and/or a different number of bits) in the field being used for indicating preemption in a frequency domain for each symbol and/or for each symbol group associated with the field. Alternatively and/or additionally, setting the value of the first higher layer parameter (e.g., the higher layer parameter INT-TF-unit, which may be associated with timeFrequencySet in the DownlinkPremption information element) to 1 may be associated with 7 symbol groups for preemption indication in a time domain.

In a third example, a base station may configure one or more parameters (properly) such that a number of symbols (e.g., a number of OFDM symbols) associated with a monitoring periodicity of a preemption indication for a cell is more than 7 (or a different number) and/or such that the number of symbols is a multiple of 12 and/or 14. Alternatively and/or additionally, the base station is not allowed to (and/or is not configured to) configure the one or more parameters in such a way that the number of symbols associated with the monitoring periodicity of the preemption indication for the cell is 7 and/or less than 7. The one or more slot parameters may correspond to $N_{symb}^{slot}$ (e.g., a number of symbols per slot), $\mu$ (e.g., a numerology associated with the cell (indicative of a subcarrier spacing configuration of the cell)), $\mu_{INT}$ (e.g., a numerology associated with a second cell (indicative of a subcarrier spacing configuration of a DL BWP on the second cell)) and/or an indication of a cell to use for preemption indication monitoring.

In a first embodiment, a base station may configure a size of DCI associated with a preemption indication (e.g., DCI for the preemption indication) and/or a starting position of a field associated with the preemption indication to a UE (and/or for the UE). In some examples, the size of the DCI associated with the preemption indication and/or the starting position of the field associated with the preemption indication may be an integer that is not a multiple of 14. Alternatively and/or additionally, the size of the DCI associated with the preemption indication may be an integer (and/or any integer) between 0 and a maximum size value. Alternatively and/or additionally, the starting position of the field associated with the preemption indication may be an integer (and/or any integer) between 0 and a maximum starting position value. Alternatively and/or additionally, the size of the DCI associated with the preemption indication and/or the starting position of the field associated with the preemption indication may be a multiple of 7.

In some examples, the preemption indication may be transmitted (to the UE) on a first cell. Alternatively and/or additionally, the preemption indication may be indicative of one or more preempted resources associated with the first cell (and/or for the first cell). Alternatively and/or additionally, the preemption indication may be indicative of one or more preempted resources associated with a second cell (and/or for the second cell). In some examples, the first cell and/or the second cell may be configured with a single subcarrier spacing (and/or a single numerology).

Alternatively and/or additionally, the first cell and/or the second cell may be configured with different subcarrier spacings (and/or different numerologies). For example, the first cell may be configured with a first subcarrier spacing and/or the second cell may be configured with a second subcarrier spacing, where the first subcarrier spacing is different from the second subcarrier spacing. For example, the first subcarrier spacing may be greater than the second subcarrier spacing (e.g., the first subcarrier spacing may be 30 KHz and/or the second subcarrier spacing may be 15 KHz). Alternatively and/or additionally, the first subcarrier spacing may be less than the second subcarrier spacing (e.g., the first subcarrier spacing may be 15 KHz and/or the second subcarrier spacing may be 30 KHz).

In some examples, a base station may configure, for a first UE, a first starting position, equal to a first number X, associated with a first preemption indication. Alternatively and/or additionally, the base station may configure, for a second UE, a second starting position, equal to a second number X+Y, associated with a second preemption indication. In some examples, the first starting position may correspond to a bit position (and/or a symbol position) of an initial bit (and/or an initial symbol) associated with the first preemption indication with respect to other bits (and/or other symbols). Alternatively and/or additionally, the second starting position may correspond to a bit position (and/or a symbol position) of an initial bit (and/or an initial symbol) associated with the second preemption indication.

In some examples, the base station may configure, for a first UE, a first starting position, equal to the first number X, associated with a first preemption indication. Alternatively and/or additionally, the base station may configure, for the first UE, a DCI format size for preemption indications. The DCI format size for preemption indications may correspond to the second number X+Y.

In some examples, the first preemption indication may be associated with first bits having first bit positions equal to positional values X, X+1, . . . , X+Y−1 (e.g., an initial bit position of the first bit positions may be equal to a positional value equal to the first number X (e.g., the first starting position), a second bit position of the first bit positions, succeeding and/or (directly) following the initial bit position, may be equal to a positional value X+1, etc. a last bit position of the first bit positions may be equal to a positional value X+Y−1). For example, the first bits and/or the first preemption indication may be carried on the first bit positions. Alternatively and/or additionally, each bit of the first bits may be equal to 0 and/or 1. Alternatively and/or additionally, the second preemption indication may be associated with second bits having second bit positions following the first bit positions (e.g., the second bit positions may be equal to X+Y, X+Y+1, . . . ). For example, the second bits and/or the second preemption indication may be carried on the second bit positions.

In an example, X may be equal to 0, a multiple of 7 and/or a multiple of 14 and/or Y may be equal to 7. Y is not equal to 14. Accordingly, an initial exemplary bit position of the first bit positions may be equal to an exemplary positional value 0 (e.g., the first starting position). A second exemplary bit position, following the initial exemplary bit position, of the first bit positions may be equal to an exemplary positional value 1. A third exemplary bit position, following the second exemplary bit position, of the first bit positions may be equal to an exemplary positional value 2. A fourth exemplary bit position, following the third exemplary bit position, of the first bit positions may be equal to an exemplary positional value 3. A fifth exemplary bit position, following the fourth exemplary bit position, of the first bit positions may be equal to an exemplary positional value 4. A sixth exemplary bit position, following the fifth exemplary bit position, of the first bit positions may be equal to an exemplary positional value 5. A seventh exemplary bit position, following the sixth exemplary bit position, of the first bit positions may be equal to an exemplary positional value 6. Each bit position of the first bit positions may be occupied by (and/or may carry) a bit associated with the first preemption indication. Alternatively and/or additionally, one or more bit positions of the first bit positions may be occupied by (and/or may carry) one or more bits associated with the first preemption indication.

In some examples, the first UE may be the same as (and/or may be different from) the second UE. Alternatively and/or additionally, a third number Y may not be 14. Alternatively and/or additionally, the third number Y may be equal to 7.

Alternatively and/or additionally, the first UE may retrieve the first preemption indication from a field (of 14 bits) comprising 14 (consecutive) bit positions (e.g., the 14 bit positions may correspond to X, X+1, X+2, . . . , X+13). Alternatively and/or additionally, the first preemption indication may be associated with 14 symbol groups. For example, each bit of the field may be associated with a symbol group (e.g., each bit position of the 14 bit positions may be associated with a symbol group).

Alternatively and/or additionally, the first UE may determine whether one or more scheduled resources are preempted based upon bits associated with bit positions corresponding to X, X+1, . . . , X+Y−1.

In some examples, bit positions corresponding to X+Y, X+Y+1, . . . , X+13 may be associated with symbol groups comprising 0 symbols (e.g., each bit position of the bit positions corresponding to X+Y, X+Y+1, . . . , X+13 may be associated with a symbol group comprising 0 symbols).

In some examples, the first UE may not determine whether one or more scheduled resources are preempted based upon bits associated with bit positions corresponding to X+Y, X+Y+1, . . . , X+13. Alternatively and/or additionally, the first UE may ignore the bits associated with the bit positions corresponding to X+Y, X+Y+1, . . . , X+13.

Alternatively and/or additionally, the first UE may determine whether one or more scheduled resources are preempted based upon bits associated with bit positions corresponding to X, X+1, . . . , X+6. Alternatively and/or additionally, bit positions corresponding to X+7, X+8, . . . , X+13 may be associated with symbol groups comprising 0 symbols (e.g., each bit position of the bit positions corresponding to X+7, X+8, . . . , X+13 may be associated with a symbol group comprising 0 symbols). Alternatively and/or additionally, the first UE may not determine whether one or more scheduled resources are preempted based upon bits associated with the bit positions corresponding to X+7, X+8, . . . , X+13. Alternatively and/or additionally, the first UE may ignore the bits associated with the bit positions corresponding to X+7, X+8, . . . , X+13.

Alternatively and/or additionally, the first UE may retrieve the first preemption indication from a field having a number of bits equal to the third number Y, wherein first bits of the field correspond to first bit positions corresponding to X, X+1, X+2, . . . , X+Y−1. Alternatively and/or additionally, the first UE may store one or more zero-bits (e.g., bits equal to 0) in second bit positions following the first bit positions (and/or may add the one or more zero-bits to the second bit positions following the first bit positions), such that a total bit length of a combination of the first bits and the one or more zero-bits is equal to 14 bits. Alternatively and/or additionally, a number of bits of the one or more zero-bits may be equal to 14-Y. For example, a second field having a number of bits equal to 14 may occupy third bit positions comprising the first bit positions and/or the second bit positions. The second bit positions may correspond to X+Y, X+Y+1, . . . , X+13. Each bit position of the second bit positions may be associated with a zero-bit (e.g., each bit position of the second bit positions may be occupied by 0).

In some examples, the first preemption indication may be associated with symbol groups. A number of symbol groups of the symbol groups may be equal to Y. For example, each bit of the first bits (e.g., associated with the number of bits equal to Y) may be associated with a symbol group of the symbol groups.

In some examples, the first preemption indication may be transmitted on (and/or using) the first cell (and/or a third cell) and/or may be carried on (and/or using) the first cell (and/or the third cell). Alternatively and/or additionally, the first preemption indication may be indicative of whether one or more scheduling resources associated with the second cell (and/or a fourth cell) are preempted. Alternatively and/or additionally, a reference resource for the first preemption indication may comprise symbols, wherein a number of symbols of the symbols may be equal to Y.

Alternatively and/or additionally, the first UE may retrieve the first preemption indication from a field (of 7 bits) comprising 7 (consecutive) bit positions (e.g., the 7 bit positions may correspond to X, X+1, X+2, . . . , X+6). Alternatively and/or additionally, the first preemption indication may be associated with symbol groups comprising a number of symbol groups equal to 7. Alternatively and/or additionally, each bit of the field (of 7 bits) may be associated with a symbol group of the symbol groups. Alternatively and/or additionally, the first preemption indication may be transmitted on (and/or using) the first cell (and/or a fifth cell) and/or the first preemption indication may be carried on (and/or using) the first cell (and/or the fifth cell). Alternatively and/or additionally, the first preemption indication may be indicative whether one or more scheduling resources associated with the second cell (and/or a sixth cell) are preempted. Alternatively and/or additionally, a reference resource for the first preemption indication may comprise symbols, wherein a number of symbols of the symbols may be equal to 7.

Alternatively and/or additionally, the number of symbols may be related to (and/or configured based upon) the second cell (and/or the sixth cell). Alternatively and/or additionally, the number of symbols may be related to (and/or configured based upon) a subcarrier spacing associated with the second cell (and/or the sixth cell). Alternatively and/or additionally, a symbol length associated with the number of symbols may be based upon the subcarrier spacing associated with the second cell (and/or the sixth cell). Alternatively and/or additionally, the symbol may be associated with the subcarrier spacing associated with the second cell (and/or the sixth cell) (and/or the symbol may be for the subcarrier spacing of the second cell and/or the sixth cell). Alternatively and/or additionally, the symbol length may be related to (and/or configured based upon) the subcarrier spacing associated with the second cell (and/or the sixth cell). Alternatively and/or additionally, the symbol length may be a length of a symbol associated with the subcarrier spacing associated with the second cell.

Alternatively and/or additionally, a first higher layer parameter (e.g., a higher layer parameter INT-TF-unit and/or a different higher layer parameter) may be set to 0 for the first preemption indication. Alternatively and/or additionally, the first higher layer parameter (e.g., the higher layer parameter INT-TF-unit and/or a different higher layer parameter) may be set to 0 for the second cell. Alternatively and/or additionally, the first higher layer parameter (e.g., the higher layer parameter INT-TF-unit and/or a different higher layer parameter) may be set to 0 for the first UE (and/or the second UE).

Alternatively and/or additionally, a first subcarrier spacing associated with the first cell may be less than (and/or greater than) a second subcarrier spacing associated with the second cell. Alternatively and/or additionally, the first subcarrier spacing associated with the first cell may be equal to half of the second subcarrier spacing associated with the second cell (e.g., the first subcarrier spacing may be 30 KHz and/or the second subcarrier spacing may be 60 KHz). Alternatively and/or additionally, the second subcarrier spacing associated with the second cell may be equal to half of the first subcarrier spacing associated with the first cell (e.g., the first subcarrier spacing may be 30 KHz and/or the second subcarrier spacing may be 15 KHz). Alternatively and/or additionally, the first subcarrier spacing for the first cell may be one of 15 KHz, 30 KHz or 60 KHz and/or the second subcarrier spacing for the second cell may be one of 30 KHz, 60 KHz or 120 KHz. Alternatively and/or additionally, the first subcarrier spacing for the first cell may be one of 30 KHz, 60 KHz or 120 KHz and/or the second subcarrier spacing for the second cell may be one of 15 KHz, 30 KHz or 60 KHz.

Alternatively and/or additionally, a second higher layer parameter (e.g., a higher layer parameter Monitoring-periodicity-PDCCH-slot and/or a different higher layer parameter) may be equal to 1. Alternatively and/or additionally, a combination, $N_{slot}^{symb} \cdot T_{INT} \cdot 2^{\mu - \mu_{INT}}$, may be equal to 7.

In a second embodiment, a base station may configure a first cell and/or a second cell for a UE. The base station may configure the UE to monitor a preemption indication associated with the second cell on (and/or using) the first cell. For example, the base station may transmit instructions associated with preemption indication monitoring to the UE. Alternatively and/or additionally, if a number of symbols (e.g., a number of OFDM symbols) associated with a monitoring periodicity (associated with preemption indication monitoring) is 7 (OFDM) symbols, the base station may set a first higher layer parameter (e.g., a higher layer parameter INT-TF-unit and/or a different higher layer parameter) to 1 (and/or the base station may configure the first higher layer parameter to be 1). Alternatively and/or additionally, if the number of symbols associated with the monitoring periodicity (associated with preemption indication monitoring) is less than 7 (OFDM) symbols, the base station may set the first higher layer parameter (e.g., the higher layer parameter INT-TF-unit and/or a different higher layer parameter) to 1 (and/or the base station may configure the first higher layer parameter to be 1).

Alternatively and/or additionally, if the number of symbols associated with the monitoring periodicity (associated with preemption indication monitoring) is 7 (OFDM) symbols, the base station may not (and/or does not) set the first higher layer parameter (e.g., the higher layer parameter INT-TF-unit and/or a different higher layer parameter) to 0 (and/or the base station may not configure the first higher layer parameter to be 0). Alternatively and/or additionally, if the number of symbols associated with the monitoring periodicity (associated with preemption indication monitoring) is less than 7 (OFDM) symbols, the base station may not (and/or does not) set the first higher layer parameter (e.g., the higher layer parameter INT-TF-unit and/or a different higher layer parameter) to 0 (and/or the base station may not configure the first higher layer parameter to be 0).

Alternatively and/or additionally, if the number of symbols associated with the monitoring periodicity (associated with preemption indication monitoring) is greater than 7 (OFDM) symbols, the base station may set the first higher layer parameter (e.g., the higher layer parameter INT-TF-unit and/or a different higher layer parameter) to 0 and/or 1 (and/or the base station may configure the first higher layer parameter to be 0 and/or 1). For example, the number of symbols associated with the monitoring periodicity (associated with preemption indication monitoring) may be 12 and/or 14. Alternatively and/or additionally, the number of symbols associated with the monitoring periodicity (associated with preemption indication monitoring) may be a multiple of 12. Alternatively and/or additionally, the number of symbols associated with the monitoring periodicity (associated with preemption indication monitoring) may be a multiple of 14.

Alternatively and/or additionally, the number of symbols may be related to (and/or configured based upon) the second cell. Alternatively and/or additionally, the number of symbols may be related to (and/or configured based upon) a second subcarrier spacing associated with the second cell.

Alternatively and/or additionally, if the second subcarrier spacing associated with the second cell is less than a first subcarrier spacing associated with the first cell and/or if the monitoring periodicity (associated with preemption indication monitoring) is set to 1, the base station may set the first higher layer parameter (e.g., the higher layer parameter INT-TF-unit and/or a different higher layer parameter) to 1 (and/or the base station may configure the first higher layer parameter to be 1). Alternatively and/or additionally, if the second subcarrier spacing associated with the second cell is less than the first subcarrier spacing associated with the first cell and/or if the monitoring periodicity (associated with preemption indication monitoring) is set to 1, the base station may not (and/or does not) set the first higher layer parameter (e.g., the higher layer parameter INT-TF-unit and/or a different higher layer parameter) to 0 (and/or the base station may not configure the first higher layer parameter to be 0).

Alternatively and/or additionally, if the monitoring periodicity (associated with preemption indication monitoring) is greater than 1 (e.g., if the monitoring periodicity is 2 and/or if the monitoring periodicity is 4), the base station may set the first higher layer parameter (e.g., the higher layer parameter INT-TF-unit and/or a different higher layer parameter) to 0 and/or 1 (and/or the base station may configure the first higher layer parameter to be 0 and/or 1).

Alternatively and/or additionally, if the second subcarrier spacing associated with the second cell is greater than the first subcarrier spacing associated with the first cell, the base station may set the first higher layer parameter (e.g., the higher layer parameter INT-TF-unit and/or a different higher layer parameter) to 0 and/or 1 (and/or the base station may configure the first higher layer parameter to be 0 and/or 1).

Alternatively and/or additionally, if the second subcarrier spacing associated with the second cell is the same as the first subcarrier spacing associated with the first cell, the base station may set the first higher layer parameter (e.g., the higher layer parameter INT-TF-unit and/or a different higher layer parameter) to 0 and/or 1 (and/or the base station may configure the first higher layer parameter to be 0 and/or 1).

In some examples, the UE may receive instructions and/or may be configured in accordance with one or more of the above configurations (of the second embodiment). Alternatively and/or additionally, the UE may not (expect to) receive instructions contradicting one or more of the above configurations (of the second embodiment) and/or the UE may not receive configurations contradicting one or more of the above configurations (of the second embodiment). In an example, the UE may not expect to be configured with the first higher layer parameter (e.g., the higher layer parameter INT-TF-unit and/or a different higher layer parameter) having a value equal to 0 if the number of symbols associated with the monitoring periodicity (associated with preemption indication monitoring) is 7 (OFDM) symbols. For example, responsive to receiving instructions and/or configurations contradicting one or more of the above configurations (of the second embodiment), the UE may perform one or more operations associated with reconfiguration failure.

In a third embodiment, a base station may configure one or more parameters such that a number of symbols (e.g., a number of OFDM symbols) associated with a monitoring periodicity associated with preemption indication monitoring associated with a cell is more than 7 (OFDM) symbols. In some examples, the one or more parameters may comprise a first parameter, $T_{INT}$, indicative of a value of a higher layer parameter Monitoring-periodicity-PDCCH-slot (and/or a different higher layer parameter). Alternatively and/or additionally, the slot one or more parameters may comprise a second parameter, $N_{symb}^{slot}$, indicative of a number of symbols per slot. Alternatively and/or additionally, the one or more parameters may comprise a third parameter, $\mu$, indicative of a numerology (and/or a subcarrier spacing) associated with a first cell (e.g., the first cell may be the cell and/or a different cell). Alternatively and/or additionally, the one or more parameters may comprise a fourth parameter, $\mu_{INT}$, indicative of a numerology (and/or a subcarrier spacing) associated with a second cell (e.g., the second cell may be the cell and/or a different cell).

Alternatively and/or additionally, the base station may configure the one or more parameters such that the number of symbols associated with the monitoring periodicity (associated with preemption indication monitoring) is 12 and/or 14. Alternatively and/or additionally, the base station may configure the one or more parameters such that the number of symbols associated with the monitoring periodicity (associated with preemption indication monitoring) is a multiple of 12. Alternatively and/or additionally, the base station may configure the one or more parameters such that the number of symbols associated with the monitoring periodicity (associated with preemption indication monitoring) is a multiple of 14.

Alternatively and/or additionally, the base station may configure the one or more parameters such that the number of symbols associated with the monitoring periodicity (associated with preemption indication monitoring) is different than 7 (OFDM) symbols. Alternatively and/or additionally, the base station may not (and/or does not) configure the one or more parameters such that the number of symbols associated with the monitoring periodicity (associated with preemption indication monitoring) is 7 (OFDM) symbols. Alternatively and/or additionally, the base station may not (and/or does not) configure the one or more parameters such that the number of symbols associated with the monitoring periodicity (associated with preemption indication monitoring) is less than 7 (OFDM) symbols. Alternatively and/or additionally, the base station may not (and/or does not) configure the one or more parameters such that the number of symbols associated with the monitoring periodicity (associated with preemption indication monitoring) is 6 (OFDM) symbols.

In some examples, the UE may receive instructions and/or may be configured in accordance with one or more of the above configurations (of the third embodiment). Alternatively and/or additionally, the UE may not (expect to) receive instructions contradicting one or more of the above configurations (of the third embodiment) and/or the UE may not receive configurations contradicting one or more of the above configurations (of the third embodiment). In an example, the UE may not expect that the one or more parameters are configured such that the number of symbols associated with the monitoring periodicity (associated with preemption indication monitoring) is 7 (OFDM) symbols and/or less than 7 (OFDM) symbols). For example, responsive to receiving instructions and/or configurations contradicting one or more of the above configurations (of the third embodiment), the UE may perform one or more operations associated with reconfiguration failure.

In a fourth embodiment, a base station may configure one or more parameters such that a combination, $N_{symb}^{slot} \cdot T_{INT} \cdot 2^{\mu-\mu_{INT}}$, is equal to 7. In some examples, the one or more parameters may comprise a first parameter, $T_{INT}$, indicative of a value of a higher layer parameter Monitoring-periodicity-PDCCH-slot (and/or a different higher layer parameter). Alternatively and/or additionally, the one or more parameters may comprise a second parameter, $N_{symb}^{slot}$, indicative of a number of symbols per slot. Alternatively and/or additionally, the one or more parameters may comprise a third parameter, $\mu$, indicative of a numerology (and/or a subcarrier spacing) associated with a first cell (e.g., the first cell may be the cell and/or a different cell). Alternatively and/or additionally, the one or more parameters may comprise a fourth parameter, $\mu_{INT}$, indicative of a numerology (and/or a subcarrier spacing) associated with a second cell (e.g., the second cell may be the cell and/or a different cell).

Alternatively and/or additionally, the base station may configure the one or more parameters such that the combination, $N_{symb}^{slot} \cdot T_{INT} \cdot 2^{\mu-\mu_{INT}}$, is equal to 12 and/or 14. Alternatively and/or additionally, the base station may configure the one or more parameters such that the combination, $N_{symb}^{slot} \cdot T_{INT} \cdot 2^{\mu-\mu_{INT}}$, is to a multiple of 12. Alternatively and/or additionally, the base station may configure the one or more parameters such that the combination, $N_{symb}^{slot} \cdot T_{INT} \cdot 2^{\mu-\mu_{INT}}$, is equal to a multiple of 14.

Alternatively and/or additionally, the base station may configure the one or more parameters such that the combination, $N_{symb}^{slot} \cdot T_{INT} \cdot 2^{\mu-\mu_{INT}}$, is not equal to 7. Alternatively and/or additionally, the base station may not (and/or does not) configure the one or more parameters such that the combination, $N_{symb}^{slot} \cdot T_{INT} \cdot 2^{\mu-\mu_{INT}}$, is equal to 7. Alternatively and/or additionally, the base station may not (and/or does not) configure the one or more parameters such that the combination, $N_{symb}^{slot} \cdot T_{INT} \cdot 2^{\mu-\mu_{INT}}$, is equal to a value less than 7. Alternatively and/or additionally, the base station may not (and/or does not) configure the one or more parameters such that the combination, $N_{symb}^{slot} \cdot T_{INT} \cdot 2^{\mu-\mu_{INT}}$, is equal to 6.

In some examples, the UE may receive instructions and/or may be configured in accordance with one or more of the above configurations (of the fourth embodiment). Alternatively and/or additionally, the UE may not (expect to) receive instructions contradicting one or more of the above configurations (of the fourth embodiment) and/or the UE may not receive configurations contradicting one or more of the above configurations (of the fourth embodiment). In an example, the UE may not expect that the one or more parameters are configured such that the combination, $N_{symb}^{slot} \cdot T_{INT} \cdot 2^{\mu-\mu_{INT}}$, is equal to 7 and/or is equal to a value less than 7. For example, responsive to receiving instructions and/or configurations contradicting one or more of the above configurations (of the fourth embodiment), the UE may perform one or more operations associated with reconfiguration failure.

In some examples, each of the first embodiment, the second embodiment, the third embodiment and the fourth embodiment, may be implemented independently and/or separately. Alternatively and/or additionally, a combination of one or more of the first embodiment, the second embodiment, the third embodiment and/or the fourth embodiment may be implemented.

It may be appreciated that a UE (as used herein) may be replaced with a transmitter. For example, one or more techniques presented herein that are described as applying to a UE may (also) be applied to a transmitter.

Alternatively and/or additionally, a UE (as used herein) may be replaced with a receiver. For example, one or more techniques presented herein that are described as applying to a UE may (also) be applied to a receiver.

Alternatively and/or additionally, a UE (as used herein) may be replaced with a base station. For example, one or more techniques presented herein that are described as applying to a UE may (also) be applied to a base station.

Alternatively and/or additionally, a UE (as used herein) may be replaced with a device being scheduled. For example, one or more techniques presented herein that are described as applying to a UE may (also) be applied to a device being scheduled.

Alternatively and/or additionally, a base station (as used herein) may be replaced with a transmitter. For example, one or more techniques presented herein that are described as applying to a base station may (also) be applied to a transmitter.

Alternatively and/or additionally, a base station (as used herein) may be replaced with a receiver. For example, one or more techniques presented herein that are described as applying to a base station may (also) be applied to a receiver.

Alternatively and/or additionally, a base station (as used herein) may be replaced with a UE. For example, one or more techniques presented herein that are described as applying to a base station may (also) be applied to a UE.

Alternatively and/or additionally, a base station (as used herein) may be replaced with a scheduler. For example, one or more techniques presented herein that are described as applying to a base station may (also) be applied to a scheduler.

It may be appreciated that techniques presented herein may be applied to various types of links (associated with communication, scheduling, etc.) and are not limited to a link between a base station and a UE. For examples, one or more techniques presented herein may be applied to a backhaul link and/or a fronthaul link (e.g., among multiple base stations and/or network points), side link and/or UU link (e.g., among multiple UEs), etc.

Alternatively and/or additionally, a symbol length of (and/or for) a resource may be related to a cell associated with the resource (e.g., the symbol length of the resource may be configured based upon the cell and/or the symbol length of the resource may be configured by the cell). Alternatively and/or additionally, the symbol length of the resource may be related to a subcarrier spacing associated with the cell (e.g., the symbol length of the resource may be configured based upon the subcarrier spacing associated with the cell).

Alternatively and/or additionally, a symbol length of (and/or for) a resource may correspond to a length of an OFDM symbol associated with a subcarrier spacing associated with a cell related to the resource.

Alternatively and/or additionally, a (physical) data channel (as used herein) may refer to a (physical) downlink data channel, an (physical) uplink data channel and/or both a (physical) downlink data channel and an (physical) uplink data channel.

Figure 15:
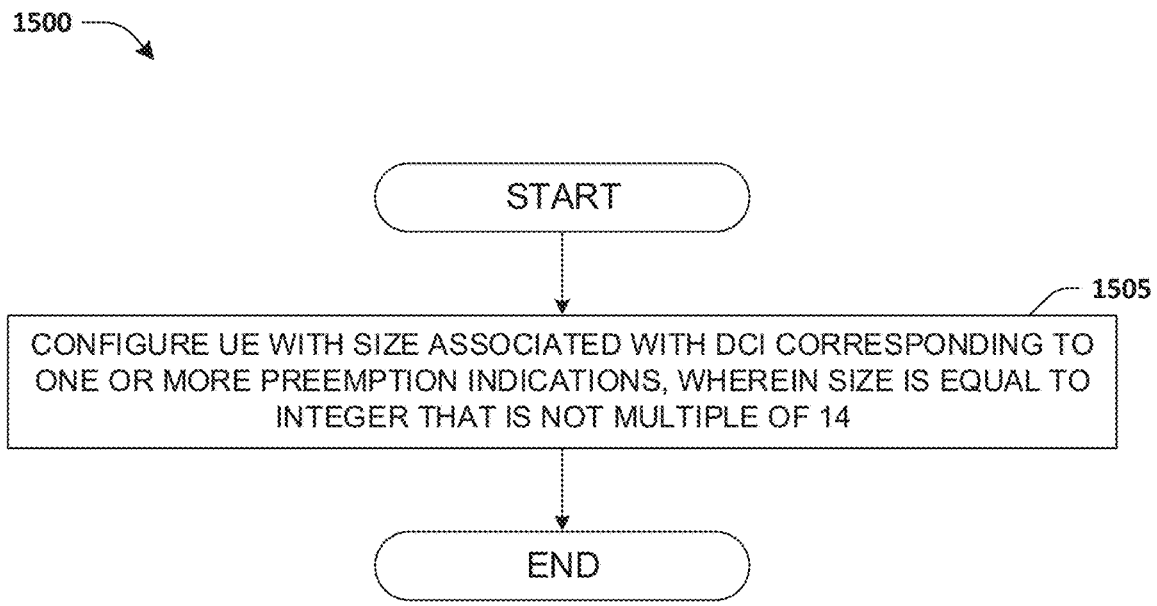
FIG. 15 is a flow chart according to one exemplary embodiment.

FIG. 15 is a flow chart 1500 according to one exemplary embodiment from the perspective of a base station. In step 1505, a base station may configure to a UE a size associated with DCI corresponding to one or more preemption indications, wherein the size is equal to an integer that is not a multiple of 14 (e.g., the UE may be configured with the size by the UE).

Figure 16:
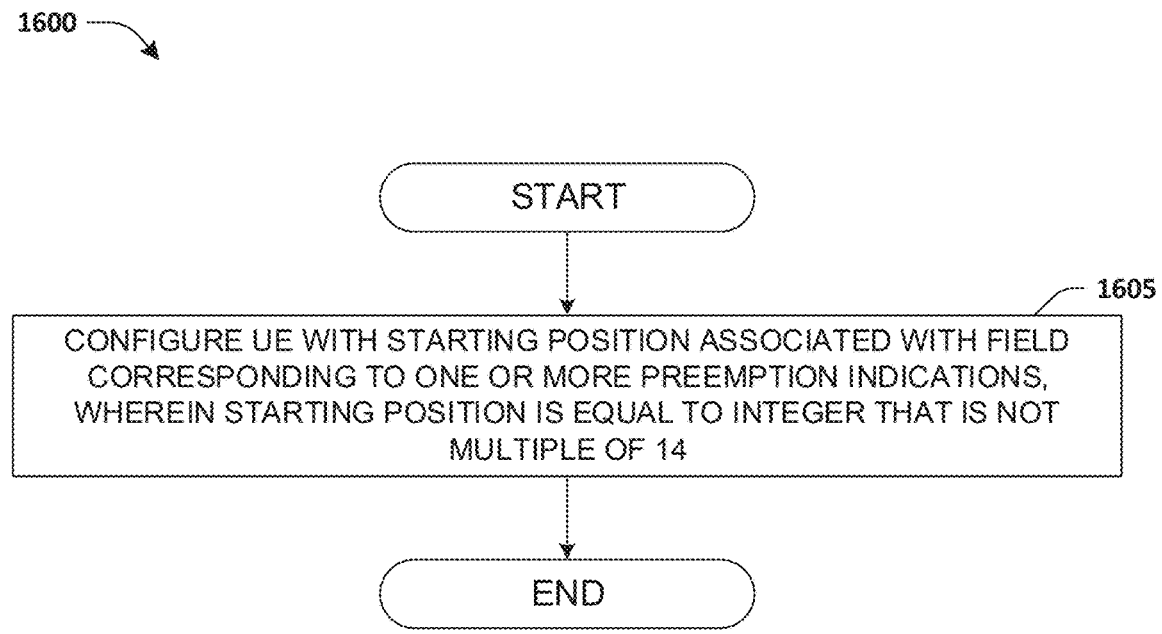
FIG. 16 is a flow chart according to one exemplary embodiment.

FIG. 16 is a flow chart 1600 according to one exemplary embodiment from the perspective of a base station. In step 1605, a base station may configure to a UE a starting position associated with a field corresponding to one or more preemption indications, wherein the starting position is equal to an integer that is not a multiple of 14 (e.g., the UE may be configured with the starting position by the UE).

Figure 17:
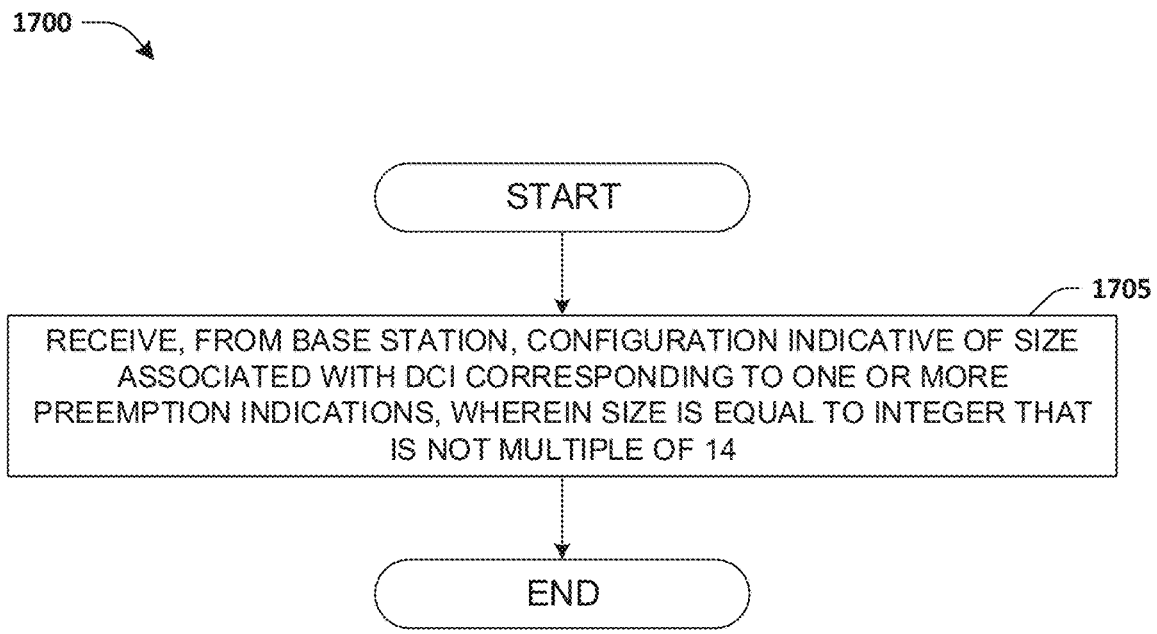
FIG. 17 is a flow chart according to one exemplary embodiment.

FIG. 17 is a flow chart 1700 according to one exemplary embodiment from the perspective of a UE. In step 1705, a configuration indicative of a size associated with DCI corresponding to one or more preemption indications may be received from a base station, wherein the size is equal to an integer that is not a multiple of 14.

Figure 18:
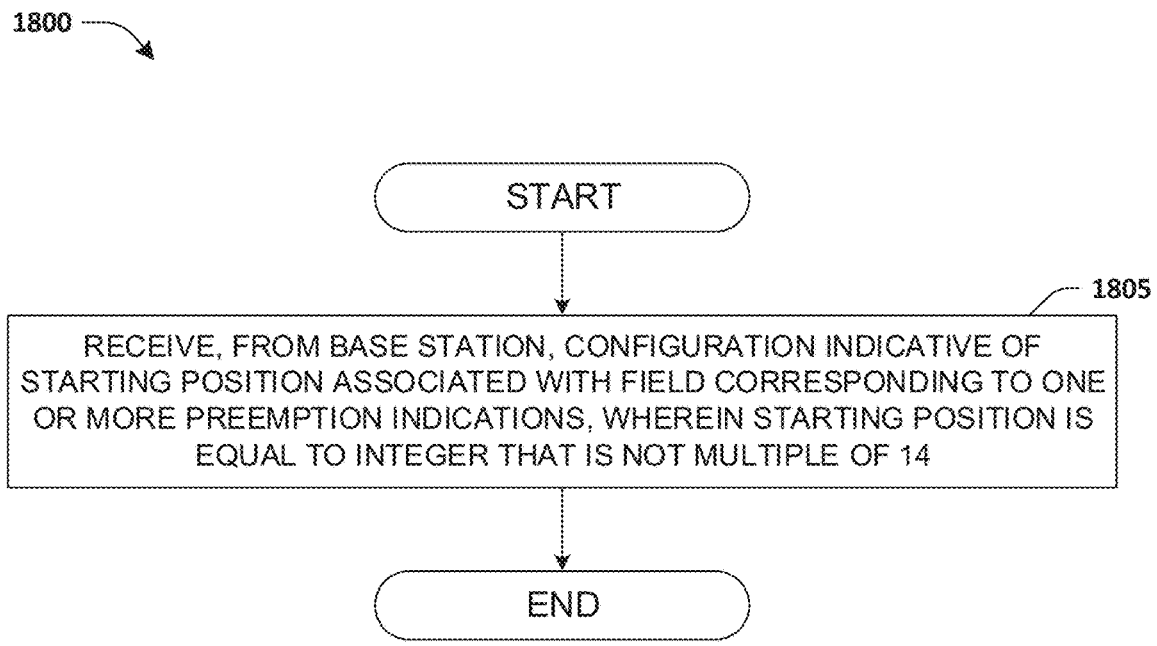
FIG. 18 is a flow chart according to one exemplary embodiment.

FIG. 18 is a flow chart 1800 according to one exemplary embodiment from the perspective of a UE. In step 1805, a configuration indicative of a starting position associated with a field corresponding to one or more preemption indications may be received from a base station, wherein the starting position is equal to an integer that is not a multiple of 14.

In the context of one or more of the embodiment illustrated in FIG. 15, the embodiment illustrated in FIG. 16, the embodiment illustrated in FIG. 17 and/or the embodiment illustrated in FIG. 18 and discussed above, the integer may be equal to a value between 0 and a maximum value.

Alternatively and/or additionally, the integer (corresponding to the size) may be equal to a value between 0 and a maximum size value.

Alternatively and/or additionally, the integer (corresponding to the starting position) may be equal to a value between 0 and a maximum starting position value.

Alternatively and/or additionally, the integer may be a multiple of 7 (e.g., 7, 14, 21, etc.).

Alternatively and/or additionally, the base station may transmit a group common PDCCH corresponding to (and/or comprising) a preemption indication to the UE. One or more first bits (of the group common PDCCH) may be indicative of one or more preempted resources (and/or the preemption indication). Alternatively and/or additionally, the one or more first bits may be used to indicate the one or more preempted resources to the UE. Alternatively and/or additionally, the one or more first bits may comprise a first number Y of bits. The first number Y may be less than 14 (e.g., the one or more bits may comprise less than 14 bits). Alternatively and/or additionally, the first number Y may be equal to 7 (e.g., the one or more bits may comprise 7 bits). Alternatively and/or additionally, the first number Y may be equal to 6 (e.g., the one or more bits may comprise 6 bits).

Alternatively and/or additionally, the starting position may correspond to a second number X. For example, the second number X may correspond to a positional value. Alternatively and/or additionally, an initial bit of the one or more first bits may have an initial bit position (e.g., the starting position) equal to the second number X. Alternatively and/or additionally, one or more (consecutive and/or not consecutive) bit positions, comprising the initial bit position (e.g., the starting position), may be used to carry the one or more first bits and/or the preemption indication (to the UE). The one or more bit positions may correspond to (consecutive and/or not consecutive) positional values X, X+1, . . . , X+Y−1.

Alternatively and/or additionally, one or more second bits may be used to indicate one or more second preempted resources (to the UE). For example, the one or more second bits may be indicative of the one or more second preempted resources and/or a second preemption indication. In some examples, a second initial bit of the one or more second bits may have a second initial bit position equal to a third number X+Y. Alternatively and/or additionally, one or more second bit positions, comprising the second initial bit position, may be used to carry the one or more second bits and/or the second preemption indication (to the UE). The one or more second bit positions may correspond to (consecutive and/or not consecutive) positional values X+Y, X+Y+1, . . . , X+13.

Alternatively and/or additionally, the UE may determine whether one or more resources (scheduled for the UE) are preempted based upon the one or more first bits (e.g., one or more preempted resources may be identified based upon the one or more first bits). Alternatively and/or additionally, the UE may not determine whether one or more resources (scheduled for the UE) are preempted based upon the one or more second bits (e.g., one or more preempted resources may not be identified based upon the one or more second bits).

Alternatively and/or additionally, the UE may retrieve the one or more bits (and/or one or more other bits wherein a number of bits of the one or more other bits is equal to the first number Y and/or the first number Y is less than 14) from the DCI corresponding to the one or more preemption indications. Alternatively and/or additionally, the UE may store one or more zero-bits (e.g., bits equal to 0) in one or more third bit positions following the one or more bit positions (and/or may add the one or more zero-bits to the one or more third bit positions following the one or more bit positions), such that a field for determining one or more preempted resources (and/or a total bit length of a combination of the one or more bits and the one or more zero-bits) is associated with 14 bits. Alternatively and/or additionally, a number of bits of the one or more zero-bits may be equal to 14-Y.

In some examples, the second preemption indication may be (configured) for the UE (and/or may be received and/or analyzed by the UE). Alternatively and/or additionally, the second preemption indication may be (configured) for a second UE (and/or may be received and/or analyzed by the second UE).

In some examples, a plurality of preemption indications may be transmitted to the UE. For example, each preemption indication may be transmitted to the UE via a set of bits of a plurality of sets of bits. For example, each set of bits of the plurality of sets of bits may comprise the first number Y of bits (e.g., a number of bits of each set of bits of the plurality of sets of bits may be equal to the first number Y). Each set of bits of the plurality of sets of bits may be used to indicate a preemption indication to the UE.

Alternatively and/or additionally, one or more sets of bits (wherein each set of bits of the one or more sets of bits comprises the first number Y of bits) may be used to indicate one or more preemption indications to the UE when (and/or responsive to a determination that) a number of symbols within a preemption indication monitoring periodicity is less than 14 symbols. Alternatively and/or additionally, one or more sets of bits (wherein each set of bits of the one or more sets of bits comprises the first number Y of bits) may be used to indicate one or more preemption indications to the UE when (and/or responsive to a determination that) a number of symbols within a preemption indication monitoring periodicity is less than 12 symbols. Alternatively and/or additionally, one or more sets of bits (wherein each set of bits of the one or more sets of bits comprises the first number Y of bits) may be used to indicate one or more preemption indications to the UE when (and/or responsive to a determination that) a number of symbols within a preemption indication monitoring periodicity is 7 symbols.

Alternatively and/or additionally, a difference between the starting position and the size may be less than 14. Alternatively and/or additionally, a difference between the starting position and the size may be 7.

Figure 19:
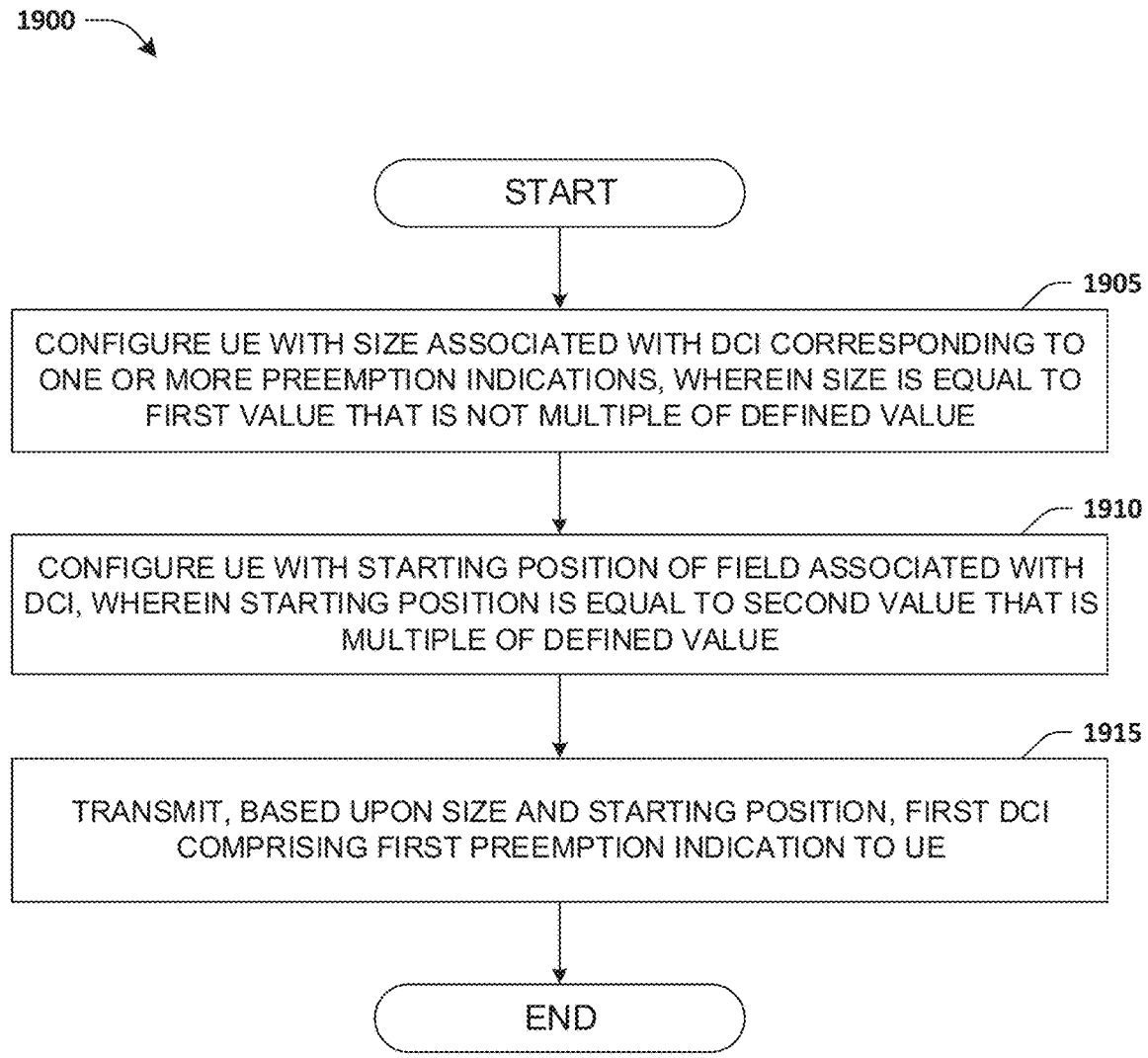
FIG. 19 is a flow chart according to one exemplary embodiment.

FIG. 19 is a flow chart 1900 according to one exemplary embodiment from the perspective of a base station. In step 1905, a UE may be configured with a size associated with DCI corresponding to one or more preemption indications. The size may be equal to a first value that is not a multiple of a defined value. In step 1910, the UE may be configured with a starting position of a field associated with the DCI (e.g., the field may be within the DCI and/or the field may be associated with the one or more preemption indications). The starting position is equal to a second value that is a multiple of the defined value. In step 1915, a first DCI comprising a first preemption indication may be transmitted to the UE based upon (and/or in accordance with) the size and/or the starting position.

Referring back to FIGS. 3 and 4, in one exemplary embodiment of a base station, the device 300 includes a program code 312 stored in the memory 310. The CPU 308 may execute program code 312 (i), to configure a UE with a size associated with DCI corresponding to one or more preemption indications, wherein the size is equal to a first value that is not a multiple of a defined value (ii) to configure the UE with a starting position of a field associated with the DCI, wherein the starting position is equal to a second value that is a multiple of the defined value, and (iii) to transmit, based upon (and/or in accordance with) the size and/or the starting position, a first DCI comprising a first preemption indication to the UE. Furthermore, the CPU 308 can execute the program code 312 to perform some and/or all of the above-described actions and steps and/or others described herein.

In the context of the embodiment illustrated in FIG. 19 and discussed above, the UE may be configured with the size associated with the DCI by generating a first configuration based upon the size and/or by transmitting the first configuration to the UE. Alternatively and/or additionally, the starting position must be equal to the second value that is a multiple of the defined value. Alternatively and/or additionally, the size may correspond to a dci-PayloadSize parameter in a DownlinkPreemption information element.

Alternatively and/or additionally, the UE may be configured with the starting position of the field associated with the DCI by generating a second configuration based upon the starting position and/or by transmitting the second configuration to the UE. Alternatively and/or additionally, the starting position may correspond to a positionInDCI parameter in a DownlinkPreemption information element.

Alternatively and/or additionally, the first DCI may be associated with DCI format 2_1. Alternatively and/or additionally, the first value of the size may be equal to an integer between 0 and a maximum size value.

Alternatively and/or additionally, the defined value may be equal to 14.

Figure 20:
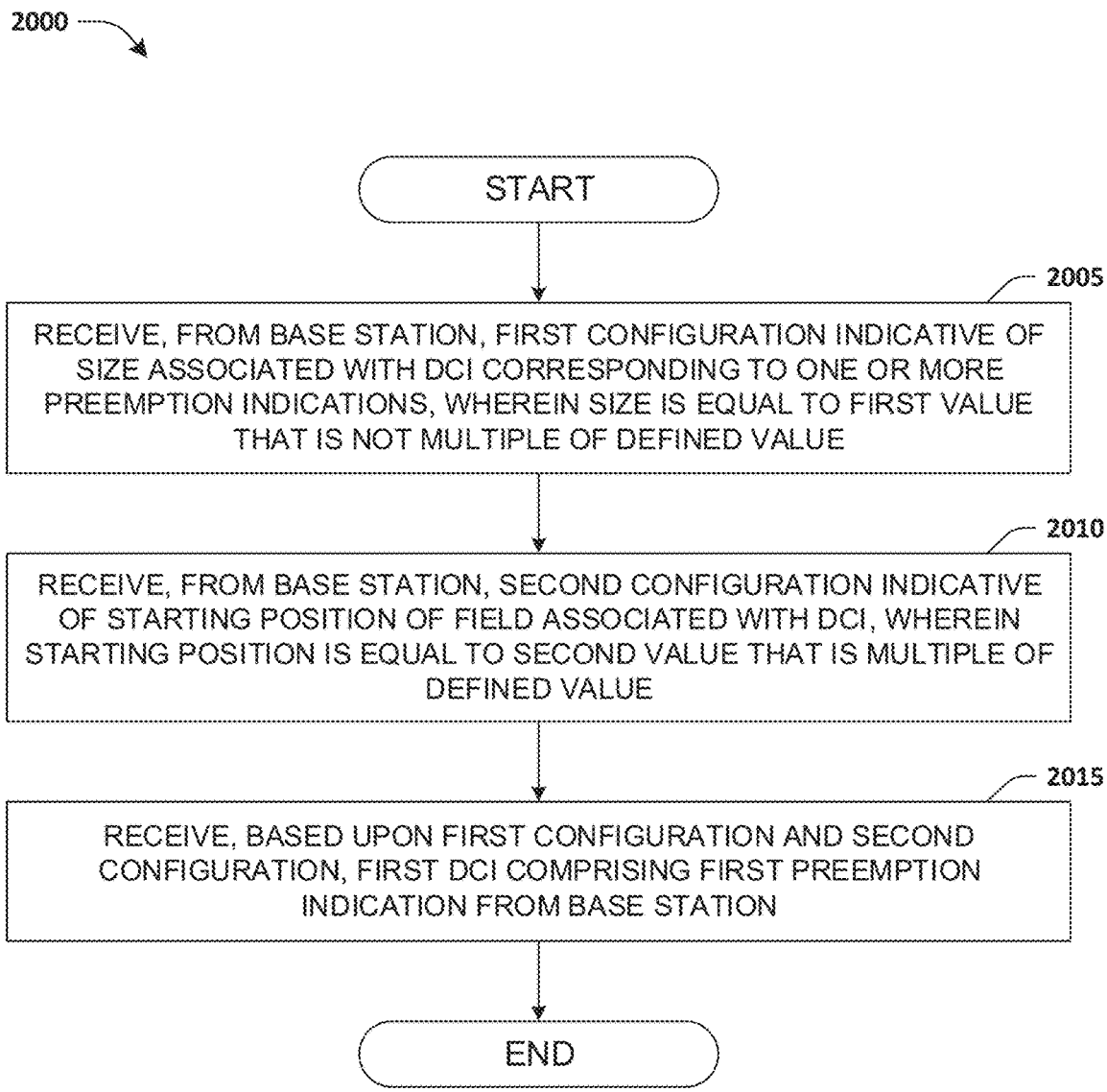
FIG. 20 is a flow chart according to one exemplary embodiment.

FIG. 20 is a flow chart 2000 according to one exemplary embodiment from the perspective of a UE. In step 2005, a first configuration indicative of a size associated with DCI corresponding to one or more preemption indications may be received from a base station. The size may be equal to a first value that is not a multiple of a defined value. In step 2010, a second configuration indicative of a starting position of a field associated with the DCI may be received from the base station (e.g., the field may be within the DCI and/or the field may be associated with the one or more preemption indications). The starting position may be equal to a second value that is a multiple of the defined value. In step 2015, a first DCI comprising a first preemption indication may be received from the base station based upon (and/or in accordance with) the first configuration and/or the second configuration.

Referring back to FIGS. 3 and 4, in one exemplary embodiment of a UE, the device 300 includes a program code 312 stored in the memory 310. The CPU 308 may execute program code 312 (i), to receive, from a base station, a first configuration indicative of a size associated with DCI corresponding to one or more preemption indications, wherein the size is equal to a first value that is not a multiple of a defined value (ii) to receive, from the base station, a second configuration indicative of a starting position of a field associated with the DCI, wherein the starting position is equal to a second value that is a multiple of the defined value, and (iii) to receive, based upon (and/or in accordance with and/or complying with) the first configuration and the second configuration, a first DCI comprising a first preemption indication from the base station. Furthermore, the CPU 308 can execute the program code 312 to perform some and/or all of the above-described actions and steps and/or others described herein.

In the context of the embodiment illustrated in FIG. 20 and discussed above, the UE may not perform one or more operations associated with reconfiguration failure responsive to receiving the first configuration (e.g., the one or more operations may comprise one or more of considering reconfiguration failure, performing a connection re-establishment procedure, etc.). Alternatively and/or additionally, the UE may not perform the one or more operations associated with reconfiguration failure responsive to receiving the second configuration.

Alternatively and/or additionally, the UE may not comply with the second configuration if (and/or responsive to determining that) the second value of the starting position is not a multiple of the defined value. Alternatively and/or additionally, the UE may perform the one or more operations associated with reconfiguration failure if (and/or responsive to determining that) the second value of the starting position is not a multiple of the defined value.

Alternatively and/or additionally, the UE receives, from the base station, a third configuration indicative of the starting position of the field associated with the DCI, wherein the starting position is equal to a third value that is not a multiple of the defined value. The UE does not receive, based upon (and/or in accordance with and/or complying with) the third configuration, a second DCI comprising a second preemption indication from the base station. The UE performs one or more operations associated with reconfiguration failure responsive to receiving the third configuration.

Alternatively and/or additionally, the size may correspond to a dci-PayloadSize parameter in a DownlinkPreemption information element. Alternatively and/or additionally, the starting position may correspond to a positionInDCI parameter in a DownlinkPreemption information element.

Alternatively and/or additionally, the first DCI may be associated with DCI format 2_1. Alternatively and/or additionally, the first value of the size may be equal to an integer between 0 and a maximum size value.

Alternatively and/or additionally, the defined value may be equal to 14.

It may be appreciated that applying one or more of the techniques presented herein may result in one or more benefits including, but not limited to, an increase in efficiency for determining a size and/or a starting position associated with a preemption indication.

A communication device (e.g., a UE, a base station, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIG. 15, FIG. 16, FIG. 17, FIG. 18, FIG. 19 and/or FIG. 20. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:
1. A method comprising:
configuring a User Equipment (UE) with a size of downlink control information (DCI) corresponding to one or more preemption indications, wherein the size of the DCI is equal to a first value that is not a multiple of a defined value;

configuring the UE with a starting position of a field in the DCI, wherein the starting position of the field in the DCI is equal to a second value that is a multiple of the defined value; and transmitting, based upon (i) the size of the DCI that is equal to the first value that is not a multiple of the defined value and (ii) the starting position of the field in the DCI that is equal to the second value that is a multiple of the defined value, a first DCI comprising a first preemption indication to the UE.

2. The method of claim 1, wherein the configuring the UE with the size associated with the DCI comprises:
generating a configuration based upon the size; and
transmitting the configuration to the UE.

3. The method of claim 1, wherein the size corresponds to a dci PayloadSize parameter in a DownlinkPreemption information element.

4. The method of claim 1, wherein the configuring the UE with the starting position of the field associated with the DCI comprises:
generating a configuration based upon the starting position; and
transmitting the configuration to the UE.

5. The method of claim 1, wherein the starting position corresponds to a positionInDCI parameter in a DownlinkPreemption information element.

6. The method of claim 1, wherein the first DCI is associated with DCI format 2_1.

7. The method of claim 1, wherein at least one of the size is in a unit of bit or the starting position corresponds to a bit position.

8. The method of claim 1, wherein the size being equal to the first value that is not be a multiple of the defined value and the starting position being equal to the second value that is a multiple of the defined value is associated with compliance with at least one of one or more configurations or one or more standards.

9. A method comprising:
receiving, from a base station, a first configuration indicative of a size of downlink control information (DCI) corresponding to one or more preemption indications, wherein the size of the DCI is equal to a first value that is not a multiple of a defined value;
receiving, from the base station, a second configuration indicative of a starting position of a field in the DCI, wherein the starting position of the field in the DCI is equal to a second value that is a multiple of the defined value; and
receiving, based upon (i) the first configuration indicative of the size of the DCI that is equal to the first value that is not a multiple of the defined value and (ii) the second configuration indicative of the starting position of the field in the DCI that is equal to the second value that is a multiple of the defined value, a first DCI comprising a first preemption indication from the base station.

10. The method of claim 9, comprising:
responsive to receiving the first configuration, not performing one or more operations associated with reconfiguration failure.

11. The method of claim 9, comprising:
responsive to receiving the second configuration, not performing one or more operations associated with reconfiguration failure.

12. The method of claim 9, comprising:
receiving, from the base station, a third configuration indicative of the starting position of the field associated with the DCI, wherein the starting position is equal to a third value that is not a multiple of the defined value; and
not receiving, based upon the third configuration, a second DCI comprising a second preemption indication from the base station.

13. The method of claim 12, comprising:
responsive to receiving the third configuration, performing one or more operations associated with reconfiguration failure.

14. The method of claim 9, wherein the first DCI is associated with DCI format 2_1.

15. The method of claim 9, wherein the first value of the size is equal to an integer between 0 and a maximum size value.

16. The method of claim 9, wherein the defined value is equal to 14.

17. A communication device, comprising:
a processor; and
memory comprising processor-executable instructions that when executed by the processor cause performance of operations, the operations comprising:
receiving, from a base station, a first configuration indicative of a size of downlink control information (DCI) corresponding to one or more preemption indications, wherein the size of the DCI is equal to a first value that is not a multiple of a defined value;
receiving, from the base station, a second configuration indicative of a starting position of a field in the DCI, wherein the starting position of the field in the DCI is equal to a second value that is a multiple of the defined value; and
receiving, based upon (i) the first configuration indicative of the size of the DCI that is equal to the first value that is not a multiple of the defined value and (ii) the second configuration indicative of the starting position of the field in the DCI that is equal to the second value that is a multiple of the defined value, a first DCI comprising a first preemption indication from the base station.

18. The communication device of claim 17, further comprising:
receiving, from the base station, a third configuration indicative of the starting position of the field associated with the DCI, wherein the starting position is equal to a third value that is not a multiple of the defined value; and
not receiving, based upon the third configuration, a second DCI comprising a second preemption indication from the base station.

19. The communication device of claim 18, further comprising:
responsive to receiving the third configuration, performing one or more operations associated with reconfiguration failure.

20. The communication device of claim 17, wherein the defined value is equal to 14.

* * * * *